United States Patent
Lin

(10) Patent No.: US 11,429,683 B1
(45) Date of Patent: *Aug. 30, 2022

(54) RECOMMENDING EDUCATIONAL APPLICATION PROGRAMS AND ASSESSING STUDENT PROGRESS IN MEETING EDUCATION STANDARDS CORRELATED TO THE APPLICATIONS

(71) Applicant: Better Learning, Inc., Lewes, DE (US)

(72) Inventor: James Lin, Palo Alto, CA (US)

(73) Assignee: Better Learning, Inc.

(*) Notice: Subject to any disclaimer, the term of this patent is extended or adjusted under 35 U.S.C. 154(b) by 361 days.

This patent is subject to a terminal disclaimer.

(21) Appl. No.: 16/573,952

(22) Filed: Sep. 17, 2019

Related U.S. Application Data

(63) Continuation of application No. 14/726,504, filed on May 30, 2015, now Pat. No. 10,467,304.

(60) Provisional application No. 62/005,064, filed on May 30, 2014.

(51) Int. Cl.
*G06F 16/9535* (2019.01)

(52) U.S. Cl.
CPC ................ *G06F 16/9535* (2019.01)

(58) Field of Classification Search
CPC ........ G06F 16/9535; G09B 5/00; H04L 67/10
See application file for complete search history.

(56) References Cited

U.S. PATENT DOCUMENTS

| | | | |
|---|---|---|---|
| 10,217,176 B2* | 2/2019 | Kapoor | G06Q 50/205 |
| 2003/0017442 A1* | 1/2003 | Tudor | G09B 7/04 434/322 |
| 2010/0262459 A1* | 10/2010 | Akian | G06Q 10/0639 705/7.38 |
| 2011/0065082 A1* | 3/2011 | Gal | G09B 7/02 434/365 |
| 2011/0171622 A1* | 7/2011 | Lippert | G06Q 10/00 434/362 |

* cited by examiner

*Primary Examiner* — Mariela Reyes
*Assistant Examiner* — Fatima P Mina
(74) *Attorney, Agent, or Firm* — Staniford Tomita LLP

(57) ABSTRACT

Activity tables for educational application programs are received. The activity tables list learning activities in the applications. Correlations of the learning activities to a set of education standards are received and an index based on the correlations is generated. A specification of an education standard a user is to satisfy is received. The index is scanned to identify which application programs have learning activities aligned to the specified education standard. User responses to the applications may be collected. Based on the user response and other usage data, the system may determine a user's level of achievement of the specified education standard.

18 Claims, 14 Drawing Sheets

| App Activity ID Tag | Description | Location |
|---|---|---|
| DCPRO.L1.P.S.1 | practice speaking exercise | module 1 |
| ... | | |

| Student Name | App Activity ID Tag | Student Response | Timestamp | Access Duration | Teacher Evaluation | Teacher Evaluation Timestamp |
|---|---|---|---|---|---|---|
| Jane Lee | DCPRO.L1.P.S.1 | recording.mp3 | 5/13/2014, 3:00PM | 30 min | 85% | 5/15/2014, 1:00PM |
| Jane Lee | DCPRO.L1.P.W.1 | essay.txt | 5/16/2014, 2:30PM | 60 min | 90% | 5/17/2014, 9:00AM |
| ... | | | | | | |

| Education Std ID | Description |
|---|---|
| US.CCSS.K.RL.1 | With prompting and support, ask and answer questions about key details in a text. |
| US.CCSS.K.RL.2 | With prompting and support, retell familiar stories, including key details. |
| ... | |

| App Activity ID Tag | Education Std ID |
|---|---|
| DCPRO.L1.P.S.1 | US.CCSS.K.RL.1 |
| DCPRO.L1.P.S.1 | US.CCSS.K.RL.2 |
| ... | ... |

RECOMMENDING EDUCATIONAL APPLICATION PROGRAMS AND ASSESSING STUDENT PROGRESS IN MEETING EDUCATION STANDARDS CORRELATED TO THE APPLICATIONS

CROSS-REFERENCE TO RELATED APPLICATIONS

This patent application is a continuation of U.S. patent application Ser. No. 14/726,504, filed May 30, 2015, which claims the benefit of U.S. provisional patent application 62/005,064, filed May 30, 2014, which is incorporated by reference along with all other references cited in this application.

BACKGROUND

The present invention relates to the field of education, including, more particularly, to systems and techniques for correlating educational computer programs and education standards in order to make recommendations and track and assess student progress in meeting the standards.

The introduction of computers such as tablets to the classroom has started a revolution in learning. Educational computing programs or educational apps can provide a rich and interactive learning experience both inside and outside the classroom. There are now many thousands of educational application programs available to students, educators, and schools. It is very difficult, however, to sort through the many thousands of applications to find those which are most appropriate. What is missing is the correlation between such application programs and education standards. Education standards are important because they establish student learning goals.

Therefore, what is needed are systems and techniques to facilitate correlations between educational application programs and education standards in order to make recommendations and to determine a level of achievement of an education standard.

BRIEF SUMMARY OF THE INVENTION

Activity tables for educational mobile applications are received. The activity tables list learning activities in the applications. Correlations of the learning activities to a set of education standards are received and an index based on the correlations is generated. A specification of an education standard a user wishes to satisfy is received. The index is scanned to identify which mobile applications have learning activities aligned to the specified education standard. User responses to the applications may be collected. Based on the user response and other usage data, the system may determine a user's level of achievement of the specified education standard.

Other objects, features, and advantages will become apparent upon consideration of the following detailed description and the accompanying drawings, in which like reference designations represent like features throughout the figures.

BRIEF DESCRIPTION OF THE FIGURES

FIG. 3 shows an example of a table storing learning activities.

FIG. 4 shows an example of a table storing student responses.

FIG. 5 shows an example of a table storing education standards.

FIG. 6 shows an example of an index storing correlations of learning activities to education standards.

DETAILED DESCRIPTION

Figure 1:
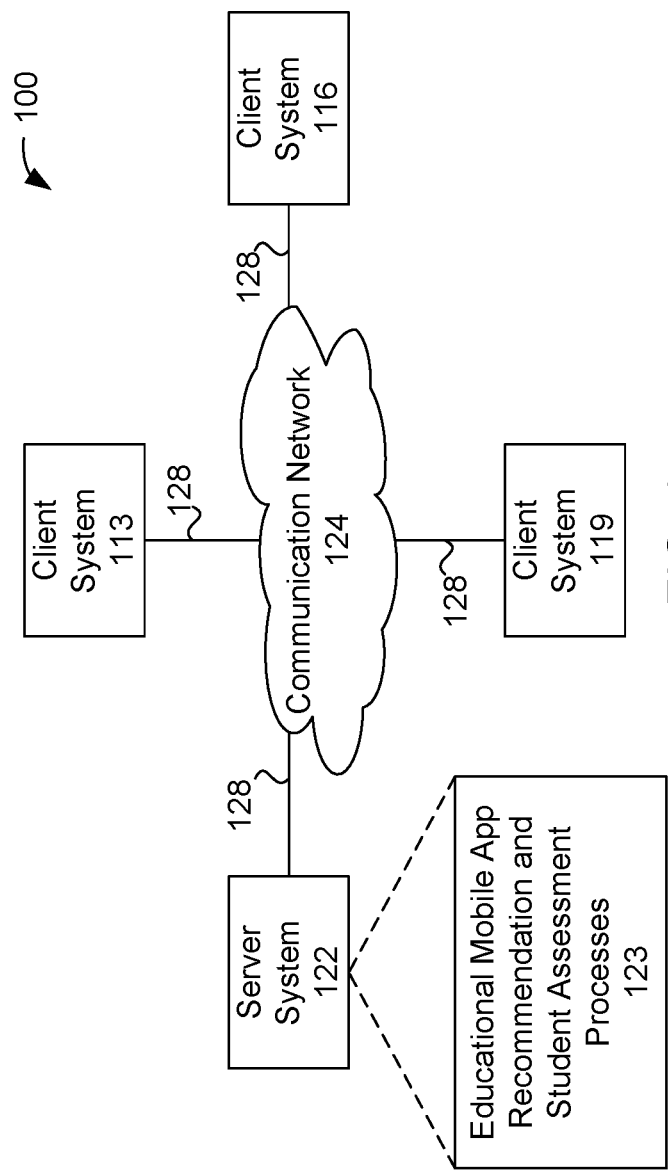
FIG. 1 shows a block diagram of a client-server system and network in which an embodiment of the system may be implemented.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device.

For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems of recommending educational mobile application programs and assessing student progress in meeting education standards correlated to the applications. Some embodiments of the invention involve correlating educational mobile applications developed by various application developers to various sets of education standards. Aspects of the one or more embodiments described herein may be implemented on one or more computers executing software instructions, and the computers may be networked in a client-server arrangement or similar distributed computer network.

FIG. 1 is a simplified block diagram of a distributed computer network 100 that implements one or more embodiments of a system for recommending educational mobile applications and assessing student progress in meeting education standards correlated to the applications. Computer network 100 includes a number of client systems 113, 116, and 119, and a server system 122 coupled to a communication network 124 via a plurality of communication links 128. Server system 122 executes processes 123 to recommend educational mobile application programs and assess student process in meeting education standards correlated to the applications. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the embodiment as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

The network may represent a cloud-based network environment in which applications, servers and data are maintained and provided through a centralized cloud computing platform. In an embodiment, system 122 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated within system 100 may be stored in any number of persistent storage locations and devices, such as local client storage, server storage, or network storage, which may at least be partially implemented through storage device arrays, such as RAID components.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Safari browser provided by Apple, Internet Explorer® browser program provided by Microsoft® Corporation, Chrome® browser provided by Google®, and the Firefox® browser provided by Mozilla® Foundation, and others. In another specific embodiment, an iOS App or an Android® App on a client tablet enables users to select, access, retrieve, or query information stored by server system 122. Access to the system can be through a mobile application program or app that is separate from a browser.

A client system, server system, or both may include a monitor, screen, cabinet, keyboard, and mouse. The mouse may have one or more buttons. The cabinet houses familiar computer components such as a processor, memory, mass storage devices, and the like.

Mass storage devices may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these. A computer (e.g., client computer) can be a desktop computer, laptop computer, or mobile communication device (e.g., tablet, phablet, or smartphone).

A computer system may include a monitor, keyboard, and mass storage devices. The computer system may further include subsystems such as a central processor, system memory, input/output (I/O) controller, display adapter, serial or universal serial bus (USB) port, network interface, and speaker. In an embodiment, a computer system includes additional or fewer subsystems. For example, a computer system could include more than one processor (i.e., a multiprocessor system) or a system may include a cache memory.

The computer system may include a system bus architecture or any interconnection scheme to link the subsystems. For example, the speaker could be connected to the other subsystems through a port or have an internal direct connection to central processor. The processor may include multiple processors or a multicore processor, which may permit parallel processing of information.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, a computer program product is provided that stores instructions such as computer code to program a computer to perform any of the processes or techniques described.

An operating system for the system may be iOS by Apple®, Inc., Android by Google®, one of the Microsoft Windows® family of operating systems (e.g., Windows NT®, Windows 2000®, Windows XP®, Windows XP® x64 Edition, Windows Vista®, Windows 7®, Windows CE®, Windows Mobile®, Windows 8), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 2:
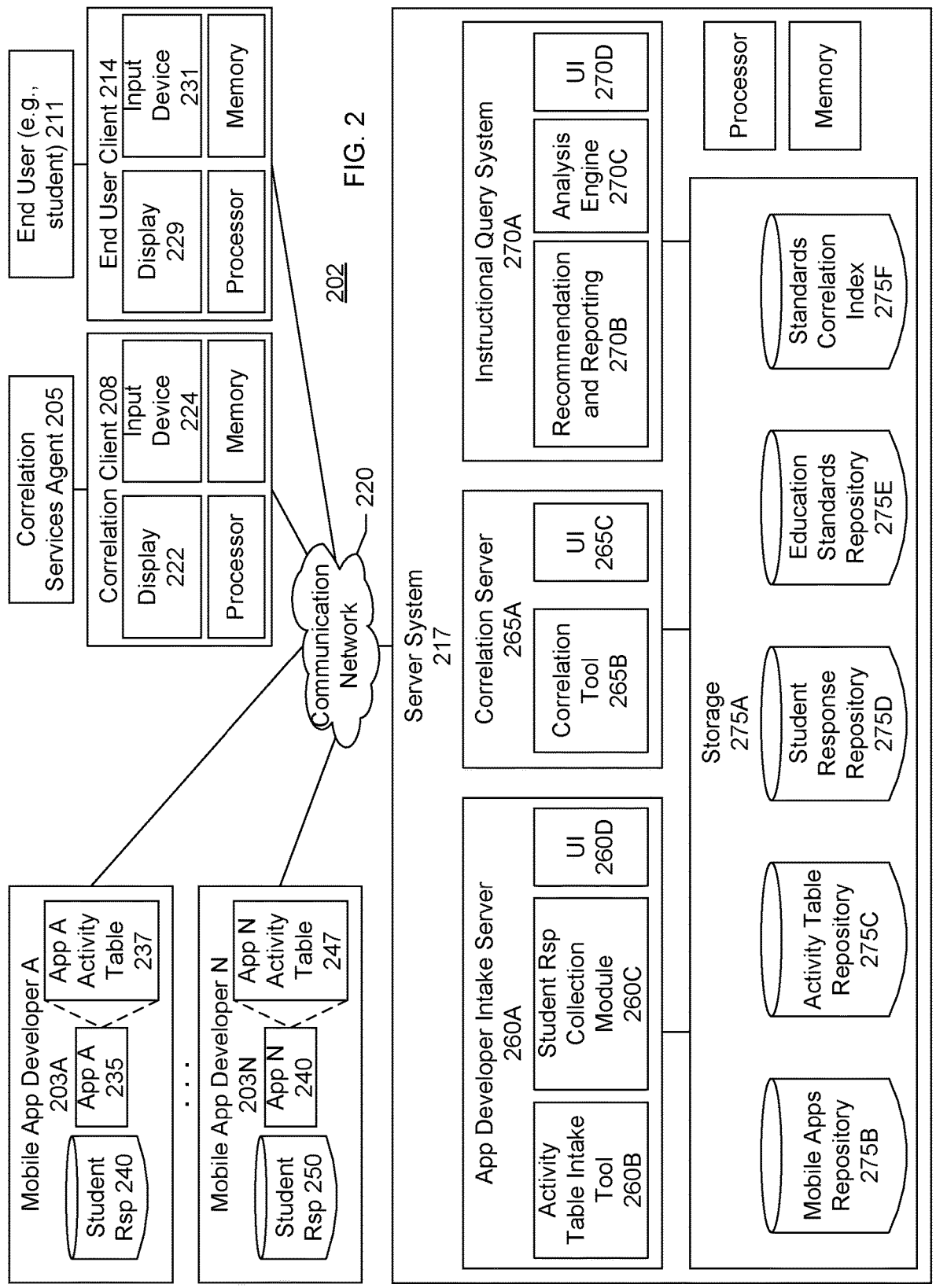
FIG. 2 shows a block diagram of an architecture of a system according to a specific embodiment.

FIG. 2 shows a block diagram of a system 202 for correlating educational mobile applications to education standards, making recommendations of mobile applications, and tracking and assessing student progress in meeting the education standards that have been correlated to the applications. This system includes any number of mobile application program developers (e.g., mobile applications developer 203A . . . 203N), a correlation agent 205 at a correlation client 208, any number of end users (e.g., student end user 211) at any number of end user clients (e.g., end user client 214), and a server system 217. The server, mobile application developer servers, correlation client, and end user clients are interconnected through a communication network 220.

Server system 217 is configured to provide services facilitating correlations of educational mobile applications developed by the mobile application developers to one or more sets of education standards, making and providing recommendations of mobile applications to end users (e.g., students, teachers, or parents), and tracking and assessing student progress in meeting the education standards correlated to the educational mobile applications.

The communication network is as shown in FIG. 1 and described above. The server and client systems may be general purpose computers with hardware and software such as described in the discussion accompanying FIG. 1. For example, the correlation client may include a display 222, an input device 224, processor, memory, and storage. Similarly, the end user client may include a display 229, an input device 231, processor, memory, and storage. In a specific embodiment, the end user client is a mobile communications device (e.g., tablet, phablet, or smartphone). Server system 217 may include a processor, memory, applications, and storage.

A mobile communications device is a small computing device that is typically small enough to be handheld. A mobile communications device may include a display screen (e.g., touch input display screen), battery (e.g., lithium battery), a miniature keyboard (e.g., soft or hard keyboard), and Wi-Fi, Bluetooth, near field communication (NFC) and global positioning system (GPS) capabilities. Such communication capabilities can allow connections to the Internet and other devices, such as an automobile or a microphone headset or can be used to provide Location-based services. A mobile communications device may further include a camera for recording video, microphone for recording sound or other audio, a media player application for video or music files, and sensors such as accelerometers, compasses, magnetometers, and gyroscopes, or combinations of these to allow detection of orientation and motion. Some specific examples of mobile communication devices include the Apple iPhone™ Apple iPad™, Samsung Galaxy™, or any device running Apple iOS™, Android™ OS, Windows Phone™, or any other mobile operating system. A mobile communication device may be referred to as a mobile device, mobile client, handheld computing device, device, or client. In another specific embodiment, the end user client is non-portable computing device such as a desktop computer.

The mobile device can run various types of application software which may be referred to as "apps." The mobile applications (or apps) are developed by mobile application developers and are made available on mobile application marketplaces for users to download and install on their mobile devices. In some cases, the applications are free to download and install. In other cases, the user is required to purchase the application. The applications may be made available under a freemium model in which a basic version of the application is provided free of charge, but a premium is charged for other features or functions. Some examples of application marketplaces include the Apple App Store, Google Play, Amazon Appstore, GetJar, Handango, and others. In another specific embodiment, an application program includes a web application. For example, the application program may include web pages and executable code that may be rendered through a web browser executing on the mobile device.

There are literally hundreds of thousands of mobile applications available which cover categories such as education, games, entertainment, music, movies, business, news, productivity, and many more. In the example shown in FIG. 2, there is a mobile application 235 that has been developed by mobile app developer A, and a mobile application 240 that has been developed by mobile app developer N.

In a specific embodiment, the mobile applications are educational applications. End users (e.g., students) can download and install the applications onto their client devices (e.g., mobile devices) and use the applications to learn things. For example, there can be applications for teaching languages (e.g., Chinese, English, Spanish, or French), reading, literacy, history, social studies, science, technical subjects, writing, math, speaking skills, listening skills, geography, music, art, and so forth. These applications can serve as valuable learning tools. It can be difficult, however, for end users such as students, parents, or teachers to sort through the vast array of applications and identify which educational mobile applications are most appropriate because such applications have generally not been correlated to any particular education standard. Thus, it is very difficult to measure and assess student progress against an education standard.

The system shown in FIG. 2, however, provides services that mobile application developers can use to have their applications correlated against an education standard. End users wishing to satisfy a particular education standard can submit a query to the system. The system searches for mobile applications aligned to the particular standard and can recommend those applications to the user (e.g., student). The system can track a student's progress through any number of applications. The system provides an algorithm for determining, based on the student's responses and other usage data, the degree to which the student has achieved (or not achieved) the particular standard.

The educational mobile applications may include any number of various learning activities. The learning activities may be organized into lessons, modules, volumes, courses, and so forth. A learning activity may include any type of interactive learning exercise such as multiple choice, true/false, matching, fill-in the blank, audio or listening task, writing (e.g., inputting text, symbols or characters, essay writing), video (e.g., student watches or records a performance), speech (e.g., e.g., student records themselves speaking), and so forth.

In a specific embodiment, student output or responses to the educational applications are transmitted to the respective application developer. For example, a student may download and install educational mobile application 235 onto their mobile device. The student's responses to the mobile application are sent from the mobile device to the application developer A (e.g., to the application developer A server system) and stored in a student response database 240. The same (or a different) student may download and install educational mobile application 245 onto the same (or a different) mobile device. The student's responses to the mobile application are sent from the mobile device to the application developer N (e.g., to the application developer N server system) and stored in a student response database 250. Instead or additionally, the student responses may be transmitted directly to server system 217.

Server system 217 provides services to collect information about the learning activities in the mobile applications, correlate the learning activities to education standards, collect student responses, grades, or both to the learning activities, assess student progress in meeting the education standards, and make recommendations for mobile applications that the user (e.g., student) may wish to use in achieving a particular education standard.

More specifically, server system 217 includes an application developer intake server 260A, a correlation server 265A, an instructional query system 270A, and storage 275A. Storage includes a mobile applications repository 275B, activity table repository 275C, student response repository 275D, education standards repository 275E, and education standards correlation index 275F.

The intake server includes an activity table intake tool 260B, a student response collection module 260C, and a user interface module 260D. The activity table intake tool provides an interface through which application developers submit an application activity table associated with an educational mobile application to the server.

The activity table lists or identifies the learning or educational activities available in the corresponding mobile application. In the example shown in FIG. 2, an activity table 237 is associated with mobile application 235 and lists the learning activities available in mobile application 235. An activity table 247 is associated with mobile application 245 and lists the learning activities available in mobile application 245. FIG. 3 shows an example of an activity table 305 that may be associated with a particular mobile application. A first column 310 of the table is labeled "AppActivityID." A second column 315 of the table is labeled "Description." A third column 320 of the table is labeled "Location."

The "AppActivityID" field stores an app activity identifier tag. The app activity identifier tag specifies a particular activity within a particular educational application program. A tag may be structured using any type of syntax, taxonomy, classification, or format. In this example, a first part of the tag ("DCPRO") identifies the educational application program ("Discovering Chinese Pro"). A second part of the tag ("L1.P.S.1") identifies the activity ("Lesson 1—Practice Speaking"). A tag may include any number of parts or attributes. For example, there can be an attribute specifying a version of the application program, an attribute specifying a particular volume, an attribute specifying an activity type (e.g., multiple choice, matching, or fill-in-the-blank), and so forth.

In a specific implementation, the protocol for the tag syntax is made available to third-party application developers so that such developers can tag or identify their applications and activities using a format that is compatible with the system. This allows other applications to leverage the system's ability to correlate learning against an education standard. The tag may be referred to as a metadata tag or label.

The "Description" field stores a description of the activity. A description may indicate, for example, the activity type (e.g., multiple choice, true/false, matching, speaking, word problems, essay question, short answer, fill-in-the-blank, and so forth), skill or area of focus of the activity (e.g., listing skills, writing skills, writing skills, or group skills), intended audience or grade-level (e.g., preschool, elementary school (e.g., first, second, third, fourth, fifth, or sixth grade), middle school (e.g., seventh, eighth, or ninth grade), high school (e.g., tenth, eleventh, or twelfth grade), college (e.g., freshman, sophomore, junior, or senior)), difficulty level (e.g., beginner, intermediate, or advanced), subject area of the activity (e.g., alphabet, counting, addition, subtraction, division, multiplication, fractions, grammar, vocabulary, and so forth), or combinations of these.

The "Location" field indicates the location within the application that the activity can be found. Consider, as an example, an educational application that is divided into a series of modules (e.g., module 1, module 2, module 3, module 4, and so forth), where each module has a set of learning activities. In this example, the "Location" field identifies the module in which the learning activity may be found. An application and its associated learning activities may be organized according to any type of taxonomy having various modules, volumes, classes, groups, categories, subcategories, and so forth and the "Location" field indicates where in the taxonomy the learn activity may be found.

Referring back to FIG. 2, in a specific embodiment, the user interface module of the intake server provides a graphical user interface (GUI) through which the application developer uploads the activity table to the system. For example, the activity table may be uploaded as a file (e.g., Microsoft Excel formatted file, comma separated values (CSV) file, plain text file, Extensible Markup Language (XML) formatted file, or other file format). Alternatively, the GUI may present to the application developer a Web page through which the application developer directly inputs the learning activities to the system. The Web page may include any number of various fields for the developer to input information including a name of the application, a developer identifier, a listing of the learning activities available in the application, a description of the application, a description of the learning activities, a description of the location in the application where the learning activities may be found, and so forth. The interface may instead or additionally include a programmatic interface such as an application programming interface (API) that the application developer can use to submit the activity table to the system.

The student response collection module is responsible for collecting student output or responses to the application learning activities. In a specific embodiment, the student responses to the application learning activities are sent from the mobile device of the student to a data store of the application developer and then forwarded to the server system. The student responses may be transmitted from the application developer data store to the server system periodically such as in batches or individually in real-time (or near real-time) as soon as the student responses are received. Sending the student responses in batch can help to reduce network congestion as the student responses may be configured to be forwarded during off-peak hours. The server system may periodically poll the various application developer data stores for the student responses. In another specific embodiment, the student responses may be sent from the mobile devices of the students to the server system and bypass the application developers.

FIG. 4 shows an example of a student response table 405 associated with a particular mobile application that may be stored in the student response repository. In this example, a record 410 includes attributes such as a student name ("Jane Lee"), app activity identifier tag ("DCPRO.L1.P.S.1"), student response ("recording.mp3"), timestamp ("5/13/2014, 3:00 PM"), access duration ("30 min"), teacher evaluation ("85%"), and teacher evaluation timestamp ("5/15/2014, 1:00 PM").

The app activity identifier tag can identify the name of the application and specific activity within the application. In other words, there is a set of app activity IDs that are associated to a unique application. The "student response" field stores the response from the student. In this example, the response is an audio recording of the student speaking. The student response may instead or additionally include a text file (e.g., text file having the student's responses to multiple choice questions), a Microsoft Word file (e.g., a Word file having the student's response to an essay questions), a video file, or any other type of file or unit of data in which a student's response may be captured and recorded. The student response field stores the evidence of data—such as a recording sample, pictures, or the answer (e.g., "a," "b," "c," or "true" or "false"). Storing the data allows for a future check against the grade received. In other words, the system can store the text response that the student submitted, such as "a," "b," "c," "true," "false," or short-text.

The "timestamp" field stores the time and date that the student submitted the response. The "access duration" field stores the duration that the student spent completing the activity. The "teacher evaluation" field stores the grade that the student received for the activity. The "teacher evaluation timestamp" field stores the time and date of the teacher's assessment. The information shown in FIG. 4 is merely an example of the student information that may be captured. In other specific embodiments, other information instead of or in addition to the information shown in FIG. 4 may be captured. This includes, for example, geographical location information of the student (e.g., address, city, state, or country), student's age, student's contact information, student's grade level, and so forth.

The correlation server provides services for correlating the learning activities in the educational applications to one or more sets of education standards. Education standards are the learning goals for what students should know and be able to do at each grade level. An education standard describes the skills, concepts, and things that a student should know. Education standards help teachers ensure their students have the skills and knowledge they need to be successful, while also helping parents understand what is expected of their children. In a specific embodiment, an education standard includes Common Core State Standards (CCSS), which is incorporated by reference. Common Core is an educational initiative in the United States that details what K-12 students should know in language and mathematics at the end of each grade.

Table A below shows an example of CCSS education standards for kindergartners, grade 1 students, and grade 2 students regarding reading standards for literature.

TABLE A

| Kindergartners | Grade 1 Student | Grade 2 Student |
| --- | --- | --- |
| 1. With prompting and support, ask and answer questions about key details in a text.<br>2. With prompting and support, retell familiar stories, including key details.<br>3. With prompting and support, identify characters, settings, and major events within a story. | 1. Ask and answer questions about key details in a text.<br>2. Retell stories, including key details, and demonstrate an understanding of their central message or lesson.<br>3. Describe characters, settings, and major events in a story, using key details. | 1. Ask and answer such questions as who, what, where, when, why, and how to demonstrate understanding of key details in a text.<br>2. Recount stories, including fables and folktales from diverse cultures, and determine their central message, lesson, or moral.<br>3. Describe how characters in a story respond to major events and challenges. |

Each standard may be tagged with an identifier. For example, the identifier "US.CCSS.K.RL.1" may refer to the U.S. Common Core State Standards, and more specifically, to the first reading standard for literature for kindergarteners (e.g., "With prompting and support, ask and answer questions about key details in a text."). In particular, a first part of the identifier or tag (e.g., "US") may refer to the organization or governmental organization. A second part of the identifier (e.g., "CCSS") may refer to the name of the standard. A third part of the identifier (e.g., "K") may refer to a grade level. A fourth part of the identifier (e.g., "RL") may refer to a main category (e.g., reading standard for literature). A fifth part of the identifier (e.g., "1") may refer to a subcategory or skill with the main category such as the first standard within the reading standard for literature for kindergartners. As another example, the identifier "US.CCSS.K.RL.2" may refer to the second reading standard for literature for kindergartners (e.g., "With prompting and support, retell familiar stories, including key details). The identifiers for the standards are unique and the system can store many different sets of education standards provided by many different organizations. In other words, there is a set of education standards IDs that are associated to unique education standards.

FIG. 5 shows an example of a table 505 storing Common Core Store State Standards. A first column of the table stores identifiers for the education standards. A second column of the table stores a corresponding description of the standard.

It should be appreciated that any nomenclature or reference structure that can uniquely identify a particular standard may be used. Furthermore, Common Core is merely an example of an education standard from a particular organization. The system can support correlating and tracking progress against other education standards such as those developed by other organizations including the International Baccalaureate (IB), United Nations Educational, Scientific and Cultural Organization (UNESCO), a particular state, a particular school district (e.g., San Francisco Unified School District (SFUSD)), and others.

An education standard may be organized hierarchically. For example, the Common Core State Standards includes three main sections including a K-5 section and two content area-specific sections for grades 6-12 including one English language arts (ELA) and one for history/social studies, science, and technical subjects. Each section is divided into strands. K-5 and 6-12 ELA have Reading, Writing, Speaking and Listening, and Language strands; the 6-12 history/social studies, science, and technical subjects section focuses on Reading and Writing. Each strand is headed by a strand-specific set of College and Career Readiness (CCR) Anchor Strands that is identical across all grades and content areas. Standards for each grade within K-8 and for grades 9-10 and 11-12 follow the CCR anchor standards in each strand. Each grade-specific standard corresponds to the same-numbered CCR anchor standard. In other words, each CCR anchor standard has an accompanying grade-specific standard translating the broader CCR statement into grade-appropriate end-of-year expectations. Individual CCR anchor standards can be identified by their strand, CCR status, and number (e.g., R.CCR.6). Individual grade-specific standards can be identified by their strand, grade, and number (or number and letter), so that RI.4.3, for example, refers to Reading, Informational Text, grade 4, standard 3 and W.5.1a refers to Writing, grade 5, standard 1a. In some cases, an education standard may include an upward articulation such as level 1, or level 2. An education standard may be articulated by grade level.

A feature of the system allows for tagging learning activities within an educational mobile application at the individual grade-specific standard level (e.g., RI.4.3). This low-level tagging allows for very flexible querying and filtering at different levels of an education standard. For example, queries can be executed based on section, strand, grade, content area, main category, subcategory, and so forth, or combinations of these (e.g., show me mobile applications having activities for a particular section, show me mobile applications having activities for a particular strand, show me mobile applications having activities for a particular grade, show me mobile applications having activities for a particular area for a particular grade, and so forth).

Referring back to FIG. 2, the correlation server includes a correlation tool 265B. The correlation tool may include a user interface 265C. The correlation tool can be accessed by correlation services agent user 205 at a client computer (e.g., correlation client 208). The correlation services agent user uses the correlation tool to correlate the learning activities in an application to one or more education standards. The correlations are used to generate standards correlation index 275F. The index cross-references the learning activities of the mobile applications to the education standards. The index may be referred to as an activity standard table.

FIG. 6 shows an example of an index 605 storing a correlation of a particular learning activity in a particular educational application to a particular education standard. For example, as shown in the example of FIG. 6, a learning activity having an app activity ID tag "DCPRO.L1.P.S.1" has been correlated to a first education standard identified as "US.CCSS.K.RL.1." The same activity has also been correlated to a second education standard identified as "US.CCSS.K.RL.2." Thus, a learning activity of an application may be correlated to one or more education standards. The education standards may be from the same or a different standards setting organization.

Referring back to FIG. 2, the instructional query system includes a recommendation and reporting engine 270B, an analysis engine 270C, and a user interface 270D. The recommendation and reporting engine is responsible for making recommendations of educational mobile applications and generating reports including an assessment of a particular student (or group of students) progress in meeting an education standard.

The analysis engine is responsible for analyzing the student responses and other application usage information to generate assessments. The analysis engine includes business logic to analyze the student responses and standards alignment information to determine whether a student has achieved or satisfied an education standard. The analysis engine may include one or more rules that may be evaluated to determine whether or not a standard has been satisfied. For examples, the rules may specify that in order for a particular standard to be satisfied, a student must receive a threshold score or grade on an activity, must complete the activity within a threshold time limit, must complete a threshold number of prerequisite activities, must receive a threshold average score or grade across two or more activities, must successfully complete at least a certain number of activities, must successfully complete a certain type of activity (e.g., writing activity, speaking activity, or multiple choice activity), and so forth. The rules can be progressive as well. For example, a student's progress against a standard can be continuously or periodically re-evaluated as new student data becomes available.

The user interface can provide a graphical user interface through which end users including students, teachers, or parents can query the system for recommendations of particular educational applications, assess a particular student's progress in meeting a particular education standard, assess a group of students (e.g., a class of students) in meeting in meeting a particular education standard, or combinations of these. Recommendations of educational mobile applications may be based on a particular education standard that the student wishes to satisfy. It should be appreciated that FIG. 2 is merely illustrative of an embodiment. The blocks can be functional rather than structural so that it is possible to have many different hardware configurations that can perform the illustrated functions. Implementation of the functional entities may vary. For example, in some cases the recommendation and analysis engine are combined into one code module. In other cases, the recommendation and analysis engine reside in separate code modules. One of ordinary skill in the art would recognize other variations, modifications, and alternatives.

Figure 7:
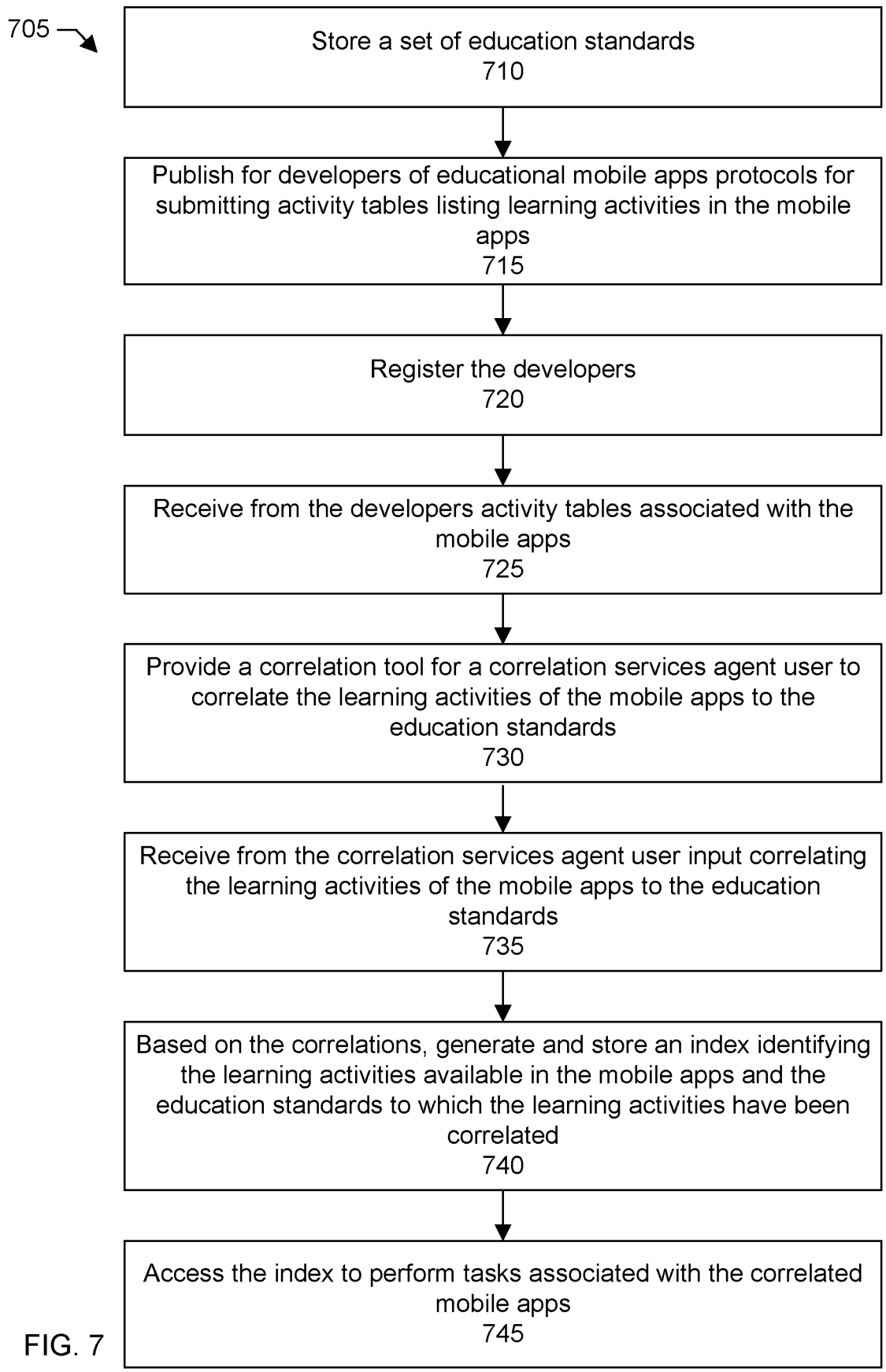
FIG. 7 shows an overall flow diagram of the system according to a specific embodiment.

FIG. 7 shows an overall flow 705 of the system. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 710, the system stores one or more sets of education standards. For example, there can be a set of national education standards (e.g., Common Core State Standards). There can be a set of state education standards of a particular state (e.g., California or Utah), and so forth. The system assigns an identifier to each education standard as shown in the example of FIG. 5.

In a step 715, protocols for submitting activity tables for educational mobile applications are published for the developers of the applications. For example, the protocols may be published on a Web page of the system for the developers to view. The protocols are guidelines that describe the format, fields, and structure of the activity table that the developers should adhere to. The system may provide an activity table template that developers can download and complete or fill-out. For example, the template may be formatted as a grid or matrix having a first column to list the application activity ID (e.g., AppActivityID), a second column to list a description of the learning activity, and a third column to specify a location within the application that the activity may be found.

In a step 720, the developers are registered with the system. For example, there can be an online registration process where the system prompts the application developers for information such as their name, address, email, phone number, website, authentication credentials (e.g., username and password), and other information. The information can then be stored in a developer directory of the system. Once a developer submits their registration information, the system assigns the developer an identifier. The identifier allows the system to track the developer's submissions.

In a step 725, the system receives from the developers activity tables associated with the mobile applications that the developers would like to have correlated to an education standard. As discussed above, in a specific embodiment, the system provides a web interface through which the developers upload or import the activity tables to the system.

Figure 8:
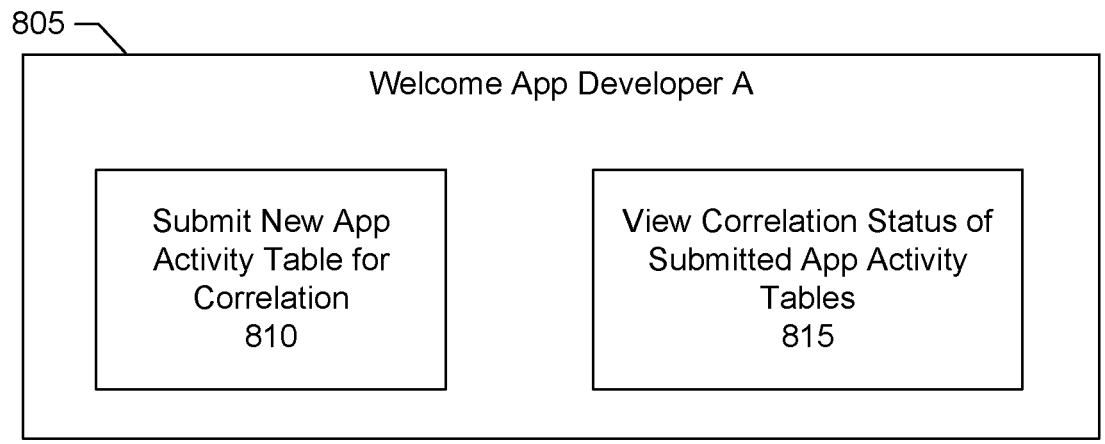
FIG. 8 shows an example of a webpage having options for submitting new application activity tables and viewing correlation status.

FIG. 8 shows an example of a webpage 805 that may be shown to a developer upon the developer logging in to the system. The webpage includes a menu listing various options or actions for the developer to select. For example, there can be a first option 810 for submitting a new application activity table for correlation. There can be a second option 815 for viewing the correlation status.

Figure 9:
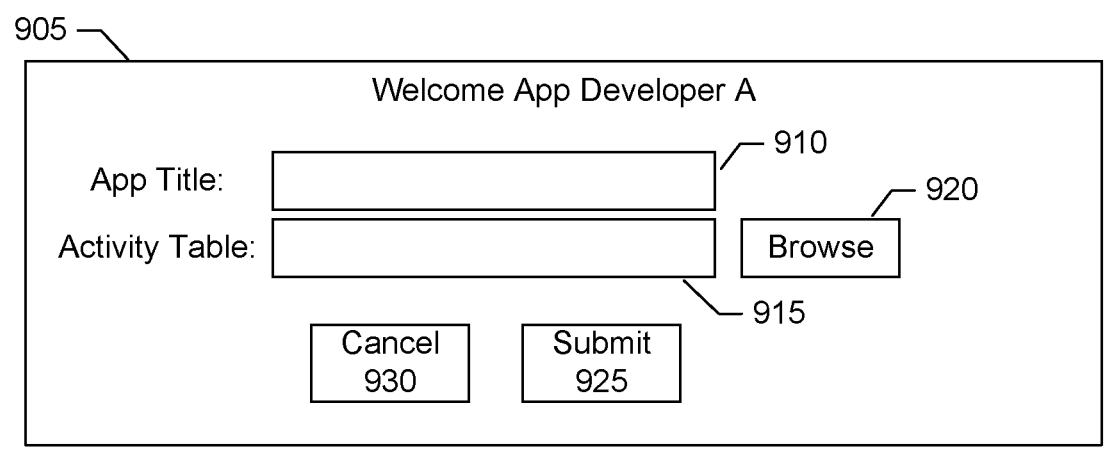
FIG. 9 shows an example of a webpage for uploading an application activity table.

FIG. 9 shows an example of a webpage 905 for submitting a new application activity table for correlation. The webpage includes first and second input boxes 910, 915, respectively. The first input box allows the developer to input the title or name of the mobile application. The second input box allows the developer to specify the activity table associated with the mobile application to be uploaded. There can be a browse button 920 which the developer can click to browse and select a file having the activity table for upload. The developer clicks a submit button 925 to submit the information to the system (or a cancel button 930 to cancel the submission).

There can be other fields to collect other information about an application such as the application version. In a specific embodiment, the system further allows the developer to submit the actual mobile application to the system. For example, the system may receive from the developer an executable version of the application, application binary, application package, or application executable. Receiving the actual mobile application helps to facilitate the review of the mobile application by the correlation services agent user. In other specific embodiments, the system may receive from the application developer a link to where the application may be found on a mobile application marketplace (e.g., an iTunes link, web link and access information).

Referring back to FIG. 7, in a step 730, the system provides a correlation tool for a correlation services agent user. The correlation tool allows the correlation services agent user to correlate the learning activities listed in an activity table of a mobile application to an education standard. In a specific embodiment, the correlation tool is a network-accessible tool or program having a graphical user interface that the correlation user uses to perform correlations. The correlation tool includes code that is delivered to from the server system to a correlation client and runs within a web browser program at the correlation client. In another specific embodiment, the correlation tool includes a programmatic interface or a command-line interface.

Figure 10:
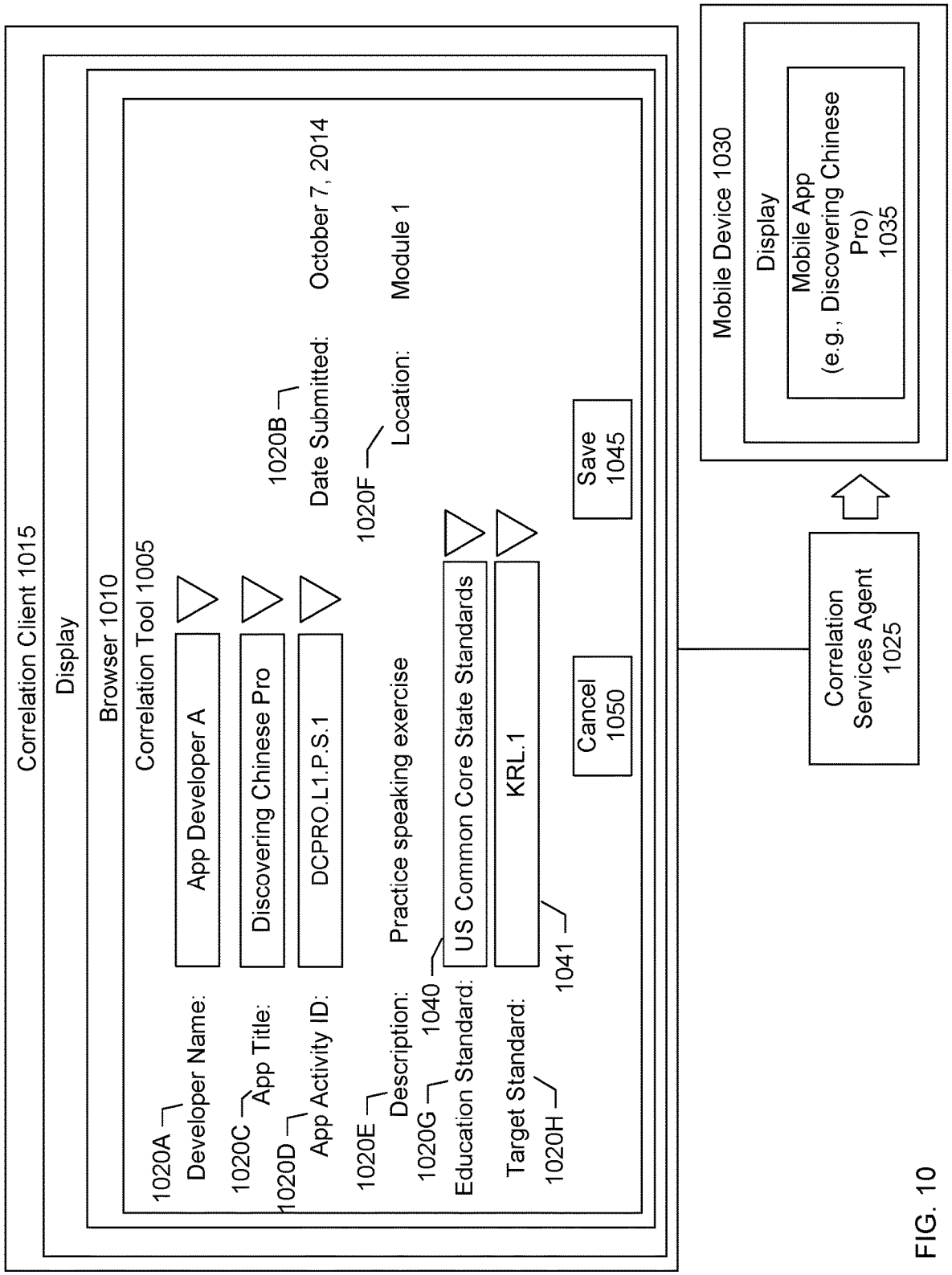
FIG. 10 shows an example of an interface of the correlation tool according to a specific embodiment.

FIG. 10 shows an example of a webpage 1005 of the correlation tool being displayed within a browser program 1010 on a correlation client 1015. The webpage includes a field 1020A listing the name of the application developer, a field 1020B indicating the date that the activity table was submitted, a field 1020C identifying a title of the mobile application from the developer, a field 1020D identifying the learning activity in the mobile application to be correlated, a field 1020E displaying a description of the learning activity, a field 1020F indicating a location within the mobile application where the learning activity may be found, a field 1020G for a correlation services agent user 1025 to specify an education standard to be correlated to the learning activity, and a field 1020H for the correlation services agent user to specify a target standard within the education standard to which the learning activity will be correlated.

In a specific embodiment, the correlation services agent user is a person (e.g., human being) who reviews an activity of the mobile application and then decides, based on the review, the education standard to which the activity should be correlated. For example, the correlation services agent user may download and install onto a mobile device 1030 an educational mobile application 1035 to be correlated. The correlation tool may be executing on a client computer which is different from the mobile device on which the educational mobile application is executing. In a specific embodiment, the educational mobile application is submitted by the application developer as part of the activity table submission process and the correlation services agent user may download the application from the mobile application repository of the system.

The location information displayed by the correlation tool allows the correlation services agent user to quickly locate and navigate to the learning activity in the mobile application. After reviewing the content in the learning activity, the correlation agent user can select from a dropdown menu 1040 the education standard that should be correlated to the learning activity. The correlation agent user can then select from a dropdown menu 1041 a subcategory (or target standard) within the selected education standard to which the learning activity is to be correlated. The correlation agent user can then click a save button 1045 to save the correlation to the system (or click a cancel button 1050 to cancel the correlation). Upon the correlation agent user saving the correlation, the system associates the learning activity (e.g., DCPRO.L1.P.S.1) to the selected education standard (e.g., US Common Core State Standards->KRL.1).

The system provides for correlating the learning activity to any number of education standards. For example, using the correlation tool, a learning activity may be correlated to a first education standard, and a second education standard, where the first education standard is published by a first organization (e.g., Council of Chief State School Officers (CCSSO) and National Governors Association (NGA)), and the second education standard is published by a second organization (e.g., state government), different from the first organization. In order to correlate a learning activity to multiple education standards, the correlation tool interface may include a control (e.g., graphical control) that displays any number of education standards from any number of different organizations. A learning activity may be correlated to multiple education standards (e.g., two or more education standards) that are part of the same set of standards. In other words, the system allows for correlating a learning activity that may cover or fulfill two or more education standards.

The system can further provide for correlating the learning activity to any number of levels of sub-categories within a particular education standard. For example, the correlation tool interface may include a first dropdown menu that lists main categories of the education standard. There can be a second sub-dropdown menu that lists sub-categories within a main category selected in the first dropdown menu.

Using the correlation tool, a correlation services agent user can query the system and filter and sort the search results. For example, the correlation services agent user can search for a particular developer by selecting the developer in the developer name dropdown menu. The correlation tool allows the correlation services agent user to search for applications that have not yet been correlated and sort the results based on the submission date. The sort may be ordered so that the earlier submissions appear above later submissions so that the correlation services agent can attend to the earlier submissions before the later submissions.

The correlation tool facilities a manual review and correlation of an educational mobile application. The correlation services agent user may be a user who has received training in the education standards and can recognize, based on their experience and training, the particular education standard that should be correlated to the learning activity. An advantage of a manual review is that the correlation services agent user can understand the various nuances in a particular learning activity and how they relate to a particular education standard. This allows for a very high degree of accuracy in ensuring that a learning activity has been properly correlated and can provide others such as application developers, students, teachers, and parents with a high degree of confidence in the correlations.

The implementation of the correlation tool shown in FIG. 10 is merely an example. A graphical user interface of the correlation tool may include a layout, UI controls (e.g., dropdown menus, button, radio buttons, check boxes, and the like), fields, graphics, or combinations of these that are different from the example shown in FIG. 10.

The system can receive educational mobile applications and corresponding activity tables for correlation from any number of different application developers. For example, the system may receive a first activity table associated with a first educational mobile application, and a second activity table associated with a second mobile application program. The first activity table may be different from the second activity table. A number of learning activities in the first activity table may be different from a number of learning activities in the second activity table. The type of learning activities listed in the first and second activity tables may be the same or different. The first and second educational mobile applications may cover the same or different subject matter. The first and second educational mobile applications may be from the same or a different application developer. A single developer may submit any number of applications for correlation.

In some cases, there can be an option for the developer to specify a particular education standard the application developer like to have their application correlated to by the correlation services agent user. For example, there may be an option on the activity table submission page for the application developer to specify Common Core or a particular state standard.

Referring back to FIG. 7, in a step 735, the system receives from the correlation services agent user input correlating the learning activities of the mobile applications to the education standards. For example, the input may be received through a webpage of the correlation tool as shown in the example of FIG. 10. In a specific embodiment, the system displays on an electronic screen a learning activity available in an educational mobile application, a location describing where in the educational mobile application the learning activity can be accessed, and a set of options listing different education standards for a correlation services user to select. The location information may specify the module, lesson, or volume in the application where the learning activity may be accessed. The system receives from the correlation services user, a selection of one or more education standards that the correlation services user wishes to correlate to the learning activity.

Figure 11:
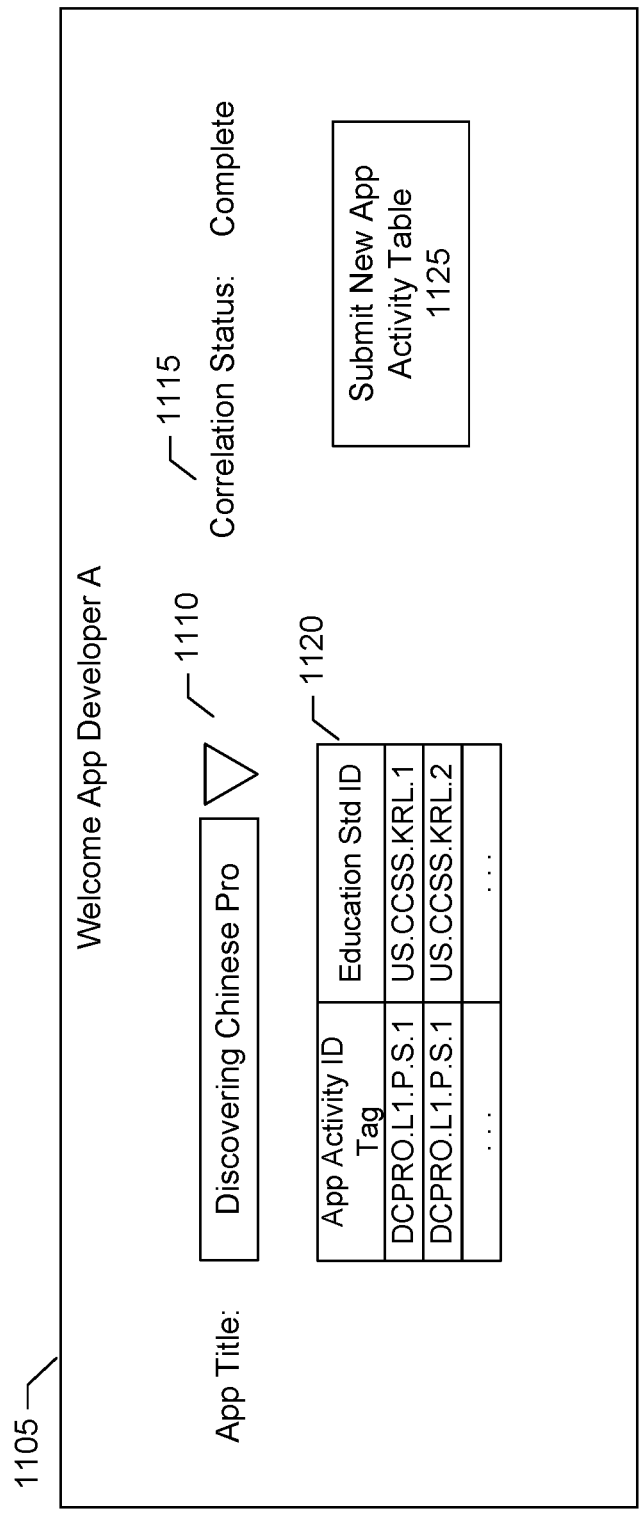
FIG. 11 shows an example of a webpage for viewing correlation status.

Upon receiving the correlations from the correlation services agent user, the system may provide a correlation status update or notification to the respective application developer. For example, the system may generate an email that is sent to the application developer to inform the developer that their application has been correlated. The system may update a webpage that the developer can access. For example, FIG. 11 shows a webpage 1105 that may be shown to a particular application developer after that developer has logged into the system. The webpage includes a dropdown menu 1110 that allows the developer to select the application that they submitted for correlation. A field 1115 displays a status of the correlation (e.g., correlation complete or correlation pending). A table 1120 lists the learning activities available in the application and the corresponding education standard that each learning activity has been correlated to. There can be a button 1125 to submit another application for correlation.

In a step 740, based on the correlations, the system generates and stores an index identifying the learning activities available in the educational mobile applications and the education standards to which the learning activities have been correlated. An example of the index is shown in FIG. 6 and described in the discussion accompanying FIG. 6.

In a step 745, the system accesses the index to perform tasks associated with the correlated educational mobile applications. Such tasks may include, for example, searching the index for applications that are aligned to a particular education standard in order to provide recommendations of one or more applications that the end user should take to achieve or satisfy the particular education standard.

A feature of the system is that correlation does not need to be done during the time of the application development. For example, additional standards can be correlated at a later time after the application is released. In other words, the system allows correlations to standards after the application is released. Decoupling the correlation from the application development process allows applications to be developed independently. Correlating can occur retroactively after an application has been released or published. The system allows existing applications to be correlated to education standards. Further, as new standards are developed or as existing standards are modified, these new or modified standards can be easily correlated to existing applications.

Figure 12:
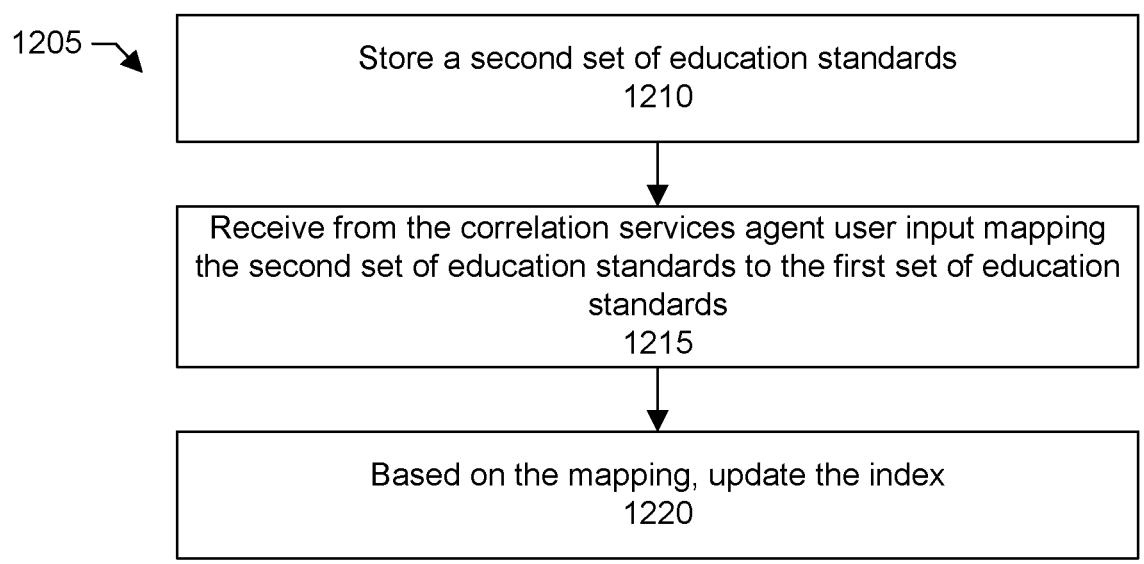
FIG. 12 a flow diagram for updating an index based on new education standards according to a specific embodiment.

FIG. 12 shows a flow 1205 in which a new set of education standards have been received. In a step 1210, the system receives and stores a second set of education standards. For example, the second set of education standards may be received after learning activities of a mobile application have been correlated to a first set of education standards, different from the second set of education standards. As an example, the first set of education standards may include the Common Core State Standards. The second set of education standards may include the standards of a particular state.

In a step 1215, the system receives from the correlation services agent user input mapping the second set of education standards to the first set of education standards. The mapping may be based on equivalencies between the first and second set of education standards that have been identified by the correlation services agent user.

There are many different sets of education standards because people and organizations have different views on what students should learn. While each set of education standard may be unique, there can often be overlap or commonality between the different sets of education standards. In a specific embodiment, the system facilitates normalizing across any number of different sets of education standards. Normalizing the different sets of education standards helps, for example, students in different schools which have adopted different education standards to select a particular mobile application that is correlated to an education standard adopted by that particular student's school. Normalizing also helps to facilitate comparisons of students who attend different schools, in different cities, states, or countries in which each may have adopted their own particular education standard.

In a specific embodiment, the correlation tool displays a first listing including the first set of education standards and a second listing including the second set of education standards. A user input control, widget, or user interface element is provided with the tool that allows the correlation services agent user to indicate the mapping between the first and second sets of education standards. For example, the control may allow the correlation services agent user to select a first education standard listed in the second set of education standards and drag the selected education standard to a second education standard listed in the first set of education standards to indicate that the first and second education standards are equivalent. In some cases, an education standard for one set of education standards will not have an equivalent education standard of another set of education standards. The manual identification of equivalencies between different sets of education standards by a trained user (e.g., correlation services agent user) helps to ensure that the mapping is performed properly.

Figure 13:
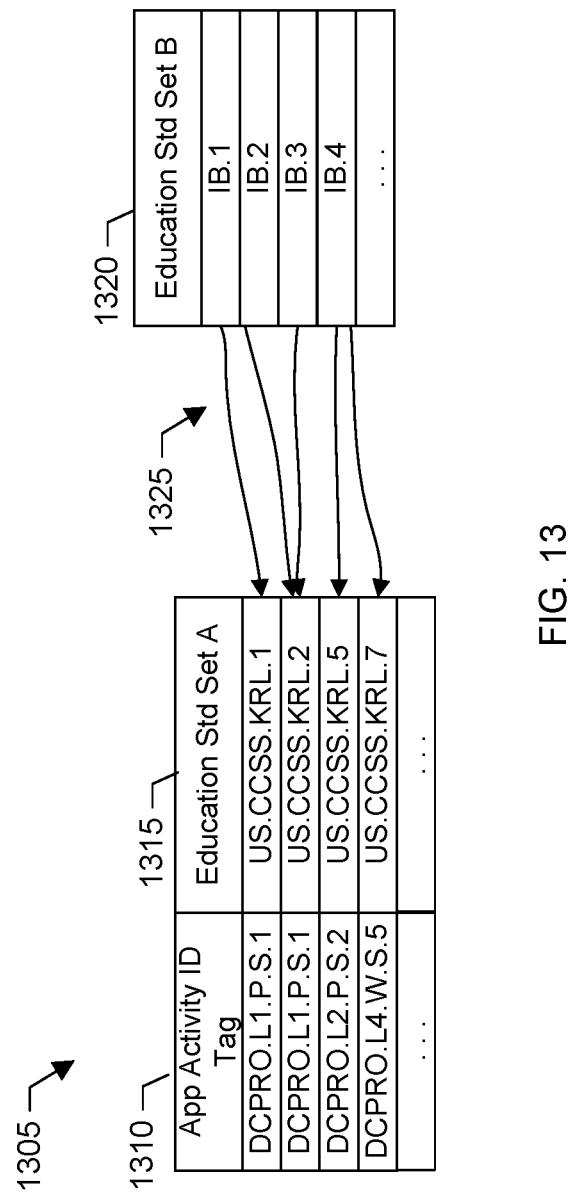
FIG. 13 shows a mapping between previous and new education standards

In a step 1220, based on the mapping between different sets of education standards, the system updates the correlation index. For example, FIG. 13 shows an index 1305 having been updated with a second set of education standards 1320. More particularly, the index includes a first column 1310, and a second column 1315. The first column lists the various learning activities of the mobile applications. The second column lists the corresponding education standards of a first set of education standards to which the learning activities have been correlated.

As discussed above, there can be a second set of education standards 1320. The system allows for a mapping 1325 of education standards of the second set of education standards to education standards of the first set of education standards. The mapping of an education standard to another education standard allows the index to be updated without having to re-review the mobile applications. In this specific embodiment, when a new education standard has been identified, the new education standard is mapped to an existing set of education standards where the existing education standards have been correlated to learning activities of the mobile application programs. Thus, once the index is updated with the mapping, a learning activity may be correlated to both an education standard of the existing or previous set of education standards and a new set of education standards without having to re-review the application to determine which of the new education standards the learning activities should be correlated to.

As shown in the example of FIG. 13, the system allows for a one-to-one mapping, a many-to-one mapping, or a one-to-many mapping. In particular, the correlation services agent user may determine, based on a review of the education standards, that an education standard of a new set of education standards maps to a single education standard of an existing set of education standards. The correlation services agent user may determine that two or more education standards of a new set of education standards map to a single education standard of an existing set of education standards. The correlation services agent user may determine that a single education standard of a new set of education standards maps to two or more education standards of an existing set of education standards. The correlation services agent user may determine that an education standard of a new set of education standards does not map to any education standard of an existing set of education standards.

Figure 14:
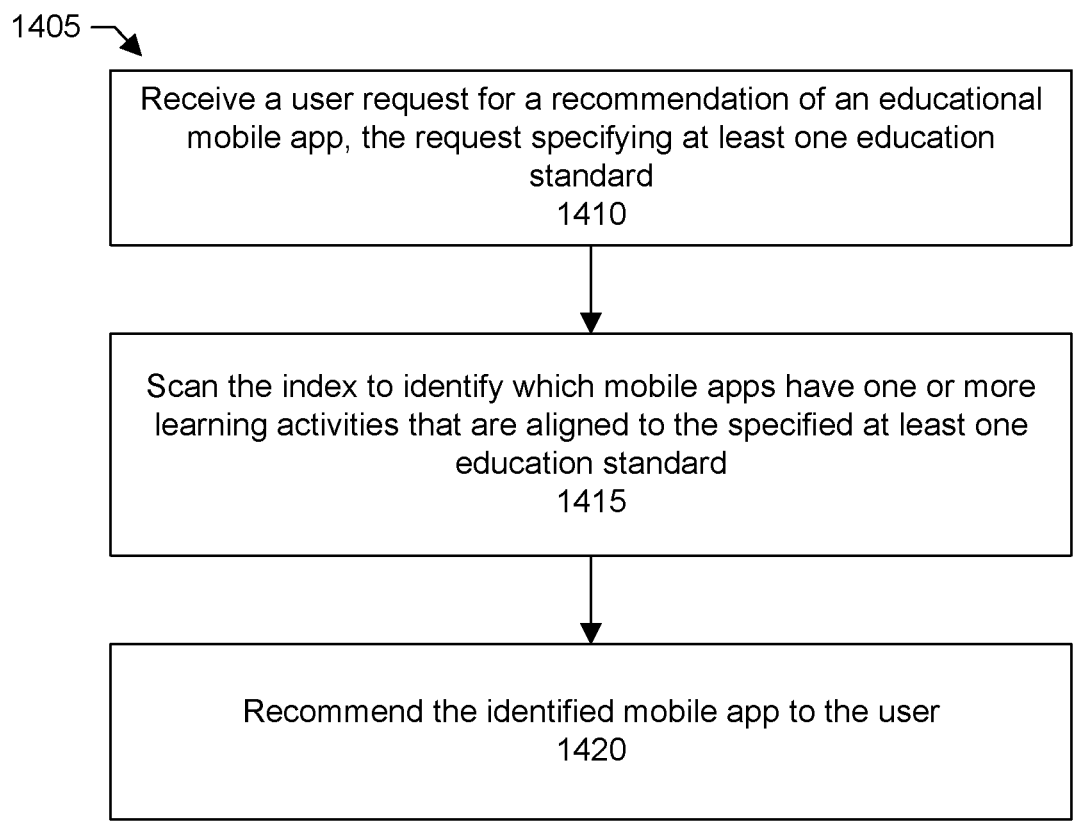
FIG. 14 shows a flow diagram for making application recommendations.

FIG. 14 shows a flow 1405 for recommending an educational mobile application to a user such as a student, teacher, or parent. In a step 1410, the system receives from a user a request for a recommendation of an educational mobile application program. The request specifies at least one education standard that the user (e.g., student) wishes to achieve.

Figure 15:
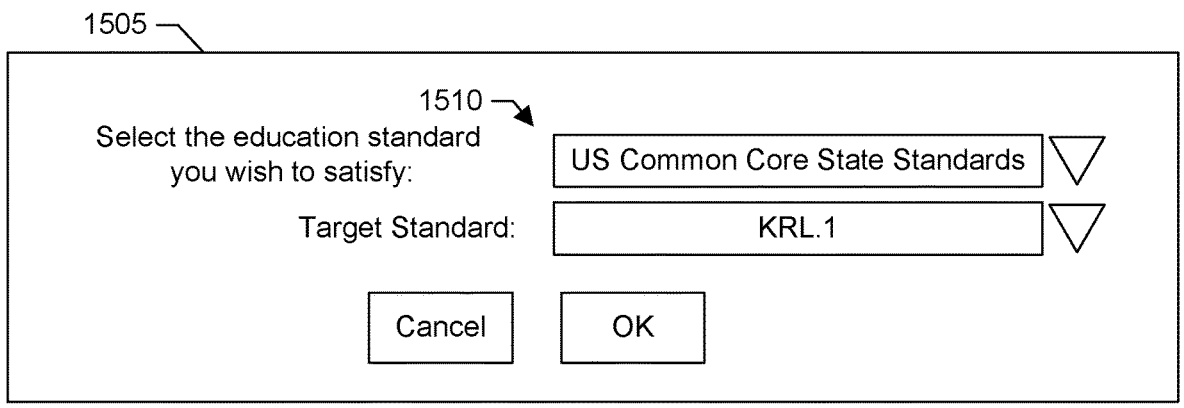
FIG. 15 shows an example of a webpage for selecting an education standard a user may wish to satisfy.

FIG. 15 shows an example of a webpage 1505 that the system may present to the user. The webpage includes a first field 1510 where the user can specify the education standard they wish to achieve. In the example shown in FIG. 15, a dropdown menu lists the various education standards. In other specific embodiments, there can be other controls (e.g., graphical controls) provided by the system through which the user can specify the education standard they wish to achieve. For example, there can be a search function in which the user can search for an education standard based on grade-level (e.g., kindergarten, first grade, second grade, or third grade), subject area (e.g., reading, science, math, or social studies), and so forth. There can be a set of checkboxes for the various education standards. The user can specify one or more education standards they would like to achieve by selecting the appropriate checkboxes.

Referring back to FIG. 14, in a step 1410, the system scans the correlation index to identify which mobile applications have one or more learning activities that are aligned to the specified at least one education standard. For example, the specified at least one education standard may be associated with an identifier (e.g., "KRL.1") and the scanning the index may including identifying which learning activities listed in the index have been correlated to the identifier associated with the specified standard (e.g., "KRL.1").

In another specific embodiment, the user may specify a main category of an education standard and the system scans the correlation index to identify which mobile applications have one or more learning activities that are aligned to subcategories within the specified main category of the education standard. The user may search at any level of an education standard to find matching mobile applications. The user may choose various levels of the standards they want to achieve. For example, a user may choose, "CCSS K1 Language Arts," and the system identifies mobile applications suitable for the chosen standard. The user may perform a more general search, e.g., "CCSS KRL" (with no numbers behind) to find mobile applications that address those general skillsets.

In a step 1420, the system cross-references the identified learning activities with the corresponding mobile applications and recommends the identified mobile applications to the user. The recommendation may include, for example, displaying on electronic screen the titles of the recommended mobile applications.

Figure 16:
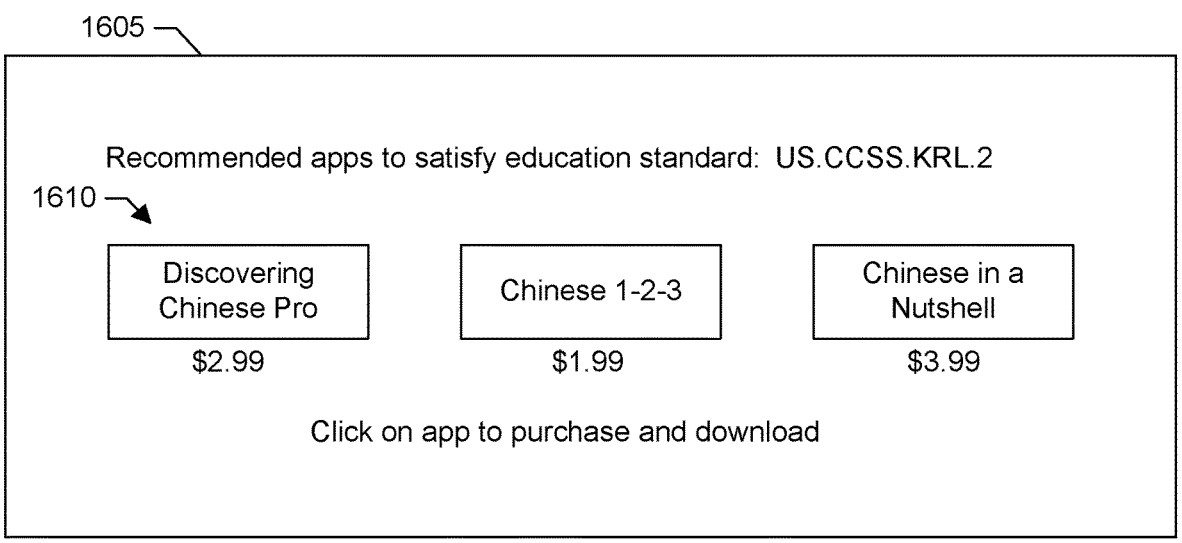
FIG. 16 shows an example of a webpage displaying a listing of recommended applications.

FIG. 16 shows an example of a webpage 1605 that the system may present to the user. In the example shown in FIG. 16, the webpage lists 1610 the applications having learning activities that are correlated to the education standard the user wishes to achieve. Applications not having learning activities correlated to the education standard the user wishes to achieve are not displayed. The user may then click on the respective application icon to download or purchase the application.

The ordering or ranking of the recommended applications may be based on any number factors such as a number of learning activities in an application that are correlated to the specified education standard, purchase history of the user, price or cost of the application, user reviews of the application, number of application downloads, or combinations of these. The recommended mobile applications may be displayed in rank order.

For example, there can be a first application having a first set of learning activities in which a first subset of the first set of learning activities are correlated to the specified education standard. There can be a second application having a second set of learning activities in which a second subset of the second set of learning activities are correlated to the specified education standard. In a specific embodiment, if a number of learning activities of the first subset is greater than a number of learning activities of the second subset, the system ranks the first application higher than the second application. The higher ranked application (e.g., first application) may be displayed first or before the lower ranked application (e.g., second application).

The system may track a user's purchase history so that applications the user has already purchased do not appear as recommendations or appear with a visual indicator to indicate that the user has previously downloaded or purchased the application. Mobile applications having a greater number of positive reviews may be ranked higher than other mobile applications having a fewer number of positive reviews. Mobile applications having a greater number of downloads may be ranked higher than other mobile applications having a fewer number of downloads.

In a specific embodiment, the system tracks the student's performance in order to recommend relevant mobile applications. For example, the system can analyze the data collected in the student response repository and the student's grades to identify gaps in the student's knowledge and recommend certain mobile applications to help fill those gaps. Recommendations may be made based on what students lack in a specific standards, such as KRL. For example, the system may receive a query regarding whether a student has the skills to go to 2nd grade Reading Courses. Based on the previous records, the system recommends certain apps to fill the gap so that the student can advance to 2nd grade Reading Courses.

In a specific embodiment, a method for making recommendations includes allowing the student to select an education standard, analyzing performance data associated with the student to determine whether the student achieved the education standard, determining that the student did not achieve the education standard, and recommending to the student a mobile application having one or more learning activities aligned to the education standard.

In another specific embodiment, there is an education standard that includes or specifies an upward articulation and a method for making recommendations includes storing performance data associated with the student, the performance data including an identification of education standards of the plurality of education standards that the student achieved, analyzing the performance data to identify a highest education standard that the student achieved, identifying an education standard of the plurality of education standards immediately above the highest education standard that the student achieved, and recommending to the student a mobile application having one or more learning activities aligned to the education standard immediately above the highest education standard that the student achieved. There can be other mobile applications having learning activities aligned to much more advanced education standards. The system, however, may not recommend these mobile applications because they may be too advanced. But, by recommending a mobile application correlated to the next education standard immediately above the highest education standard that the student has achieved, the system helps the student to smoothly advance to the next level in their education without becoming frustrated with an application that might be too advanced.

In another specific embodiment, a method for making recommendations includes storing information correlating learning activities of educational mobile applications to subcategories within an education standard, receiving a selection of the education standard, analyzing performance data of a student to determine whether the student achieved each subcategory of the education standard, determining that the student did not achieve a first subcategory of the education standard and did achieve a second subcategory of the education standard, recommending to the student a first educational mobile application, and not recommending to the student a second educational mobile application, where the second educational mobile application includes a learning activity aligned to the second subcategory of the education standard, and the first educational mobile application includes a learning activity aligned to the first subcategory of the education standard.

In another specific embodiment, a method for making recommendations includes storing information correlating learning activities of educational mobile applications to subcategories within an education standard, receiving a selection of the education standard, analyzing performance data of a student to determine whether the student achieved each subcategory of the education standard, determining that the student did not achieve a first subcategory of the education standard, recommending to the student a first educational mobile application, and not recommending to the student a second educational mobile application, where each of the first and second educational mobile applications includes one or more learning activities aligned to the first subcategory of the education standard, and a number of the one or more learning activities in the first educational mobile application that are aligned to the first subcategory is greater than a number of the one or more learning activities in the second educational mobile application that are aligned to the first subcategory. This feature of the system helps to ensure that the student is making efficient use of their time. In particular, the system can provide recommendations of mobile applications that have the most number of relevant learning activities; and mobile applications that have a relatively small number of relevant learning activities may not be provided as recommendations.

Figure 17:
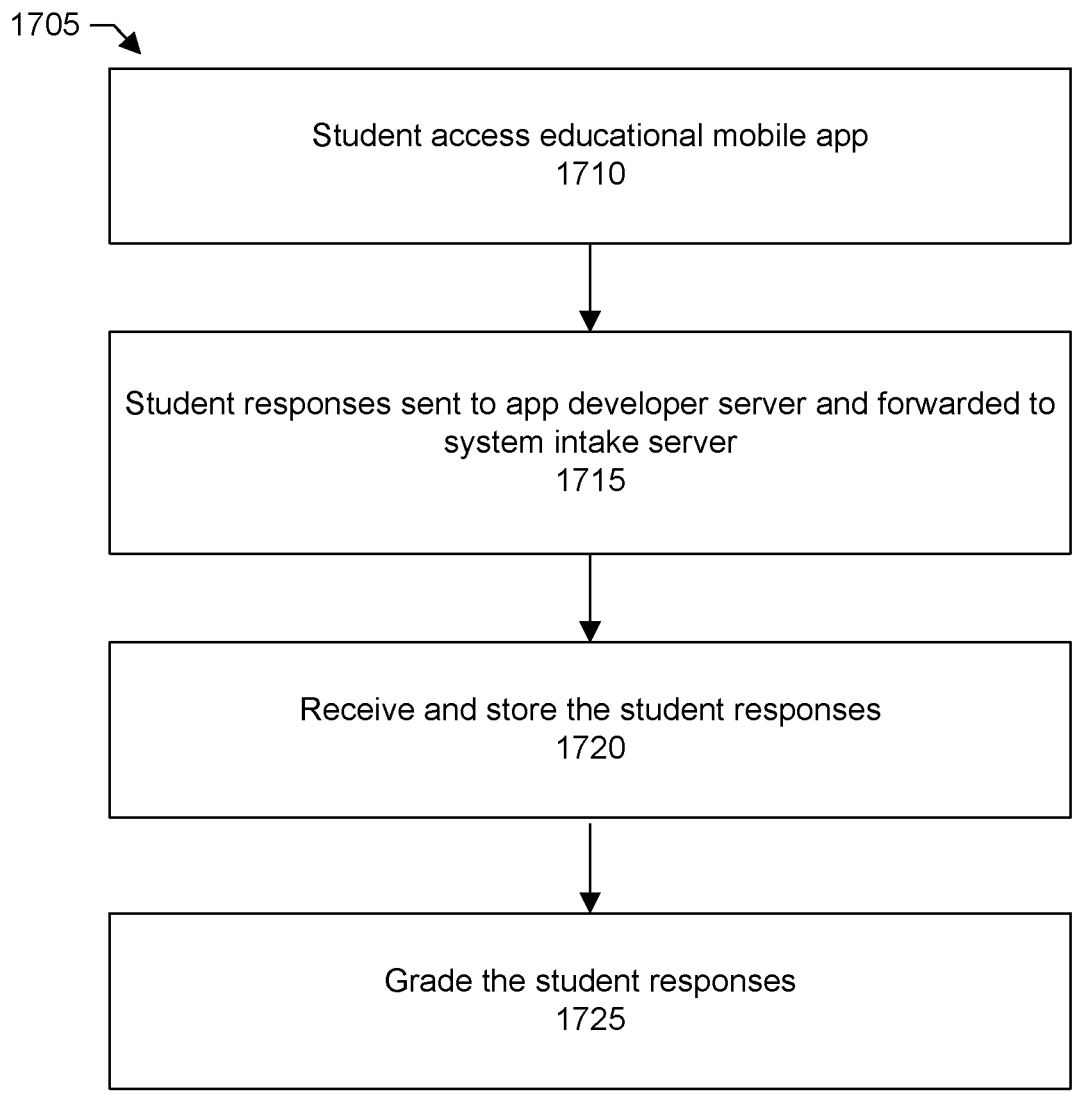
FIG. 17 shows a flow for receiving student responses to the applications according to a specific embodiment.

FIG. 17 shows a flow 1705 for collecting student responses to the educational mobile applications. In a step 1710, the student user accesses the educational mobile applications on the mobile device and engages in the various learning activities available in the applications. In a step 1715, the student responses are sent from the mobile device to the application developer and then forwarded to the intake server of the system. As discussed above, in another specific embodiment, the student responses may be sent directly from the mobile device of the student to the intake server and bypass the application developer.

In a step 1720, the system receives and stores the student response (see, e.g., student response table 405—FIG. 4). In a specific embodiment, the application developer is responsible for grading all the responses by the student. For example, the educational mobile application from the developer may include a grading module to automatically grade the student responses. Instead or additionally, the application developer may provide for a grader (e.g., a person) who manually reviews and grades the student responses. Manual grading may be used when, for example, the learning activity is of a type that includes free-responses (e.g., essay writing or practice speaking).

Automatic grading may be used when, for example, the learning activity is of a type that includes definitive answers (e.g., multiple choice, true/false, or matching). The results and the evidence (e.g., student response content) is sent (e.g., by the grader or the mobile application) to the server system for storage of the evidence (e.g., mp3 file, answers, etc.) and results. In a specific embodiment, the results or grade is a percentage score from 0 to 100. In another specific embodiment, the results or grade may include a binary assessment (e.g., pass/fail or satisfactory/unsatisfactory) or a letter grade (e.g., A, B, C, D, or F).

In a step 1725, the student responses to the learning activities are graded. In a specific embodiment, the student responses are graded automatically by the system. In this specific embodiment, the application developer may submit with the activity table an answer key that lists the answers associated with the learning activities listed in the activity table. The system compares the student responses to the learning activities to the answer key to grade the responses. In another specific embodiment, the student responses may be graded by the application developer (or a third-party associated with the application developer) and the grades may be sent along with the responses to the system.

In some cases, however, the learning activities may be non-determinate or free-response such as in cases where the student response includes a speaking exercise or an essay writing exercise. In a specific embodiment, the application developer may submit to the system a rubric or guideline indicating how such a response should be graded.

For example, a grading rubric for an essay may provide guidelines for grading an essay according to criteria including organization, coherency, sentence skills, reasoning, grammar, development of facts and arguments, persuasiveness, syntax, word choice, fluency, voice, conventions, content, and so forth. In this specific embodiment, an administrative user may conduct a manual review of the student response and grade the response according to the rubric. The grade can then be entered through an interface of the system. In another specific embodiment, non-determinate learning activities may be graded by the application developer and the grades are sent from the application developer to the system.

In a specific embodiment, the server system receives a student response from a mobile application after an active submit sequence takes place. In this specific embodiment, the student response is received directly from the applications if the responses are "pre-determined" such as multiple choice questions. If, however, the learning activities are of a type where the answers are not "pre-determined," such as an essay question, the system allows a grader to grade the response, and at the instance that the grade has been determined by the grader, the response is then sent to the server. In a specific embodiment, when the results or answers do not have a definitive answer, are not predetermined, or are free-form type responses (e.g., essay writing or speaking exercise), it is the developer's responsibility to link to a third party service or themselves to grade the response. In this specific embodiment, the system receives the graded responses and the evidence of the student output (e.g., content of the student response).

Figure 18:
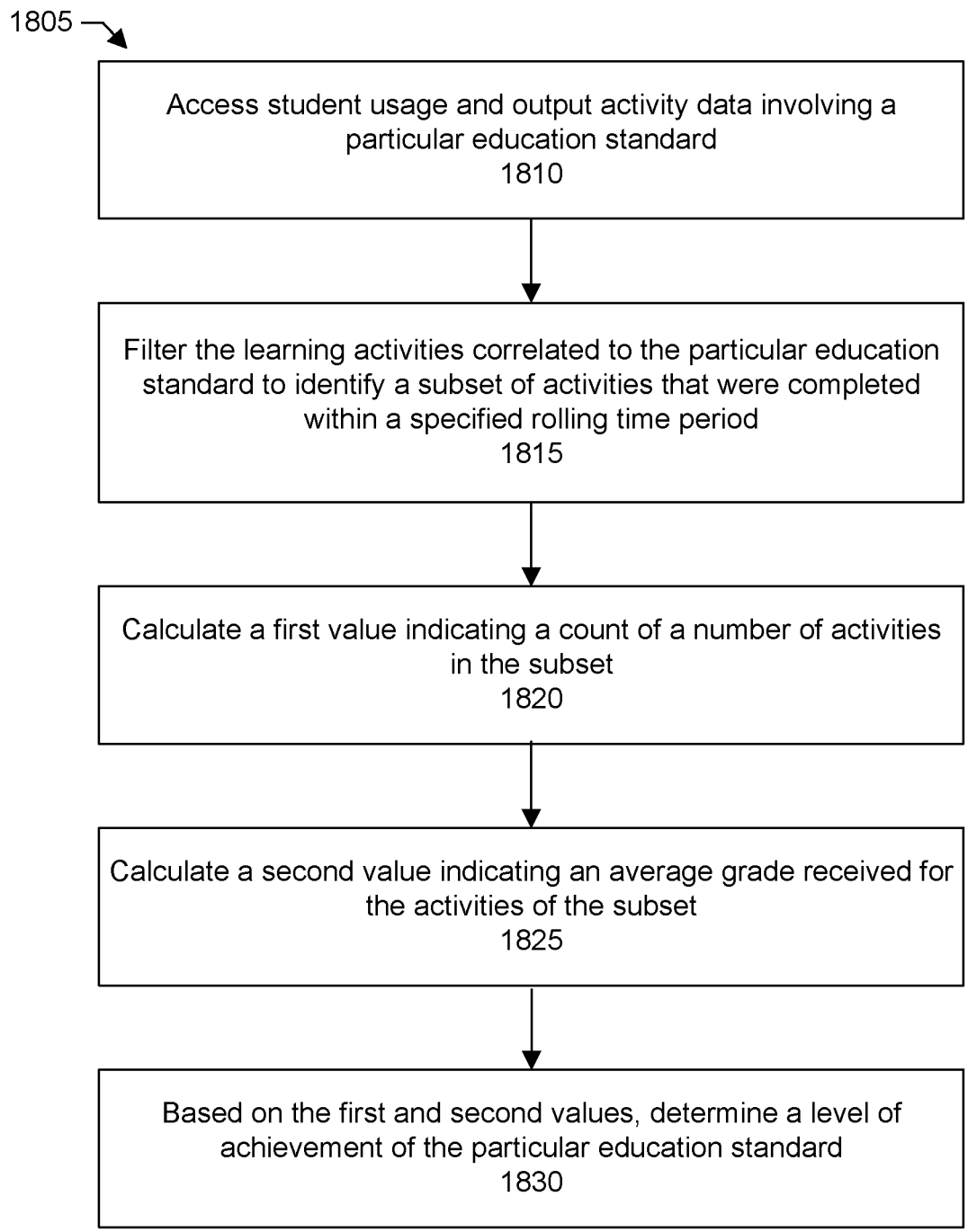
FIG. 18 shows a flow for determining a student's level of achievement of a particular education standard according to a specific embodiment.

FIG. 18 shows a flow 1805 for determining a student's level of achievement of a particular education standard or skill. In a step 1810, the system accesses student usage and output activity data involving a particular education standard. The student usage and activity data may include a time and date that the user accessed a learning activity correlated to the particular education standard, a duration that the user spent accessing the learning activity, a grade the user received on the learning activity, a number of times the student accessed or completed the learning the activity, or combinations of these.

The data may include usage and activity data from any number of learning activities from any number of mobile applications developed by any number of application developers as long those learning activities are correlated to the particular education standard of interest. For example, the data may include usage and activity data associated with first and second learning activities in a first mobile application, where the first and second learning activities are correlated to the particular education standard of interest. The data may include usage and activity data associated with a first learning activity in a first mobile application, and usage and activity data associated with a second learning activity in a second mobile application, different from the first mobile application, where the first and second learning activities are correlated to the particular education standard of interest. The first and second mobile applications may be from the same or different developer.

In a specific embodiment, determining a student's level of achievement of a particular education standard is based on the student having completed the correlated learning activities with a pre-determined time period. The time period may be a rolling time period. In this specific embodiment, correlated learning activities within the rolling time period are included in the determination and correlated learning activities outside the rolling time period are excluded or omitted from the determination. For example, the system may calculate a cut-off date from a current date. Learning activities completed before the cut-off date may be excluded. Learning activities completed after the cut-off date may be included. The cut-off date may be determined by subtracting a pre-determined and configurable amount of time from the current date.

In a specific embodiment, the rolling time period is configured as a 32-week window. In this specific embodiment, correlated learning activities completed less than 32 weeks from the current time are included in determination and correlated learning activities completed more than 32 weeks from the current time are excluded or omitted from the determination. Thus in this specific embodiment, a student may have completed a learning activity and received a grade, but the learning activity (and grade) will be excluded from the determination if the learning activity was completed outside the specified rolling time period. The rolling time period can be a configurable value. For example, the rolling time period value may be configured by an administrator (e.g., school administrator or parent or the learner herself).

The rolling time period feature helps to ensure an accurate assessment of the degree to which a student has achieved or satisfied the particular education standard. For example, in some cases mastery of a subject requires a sustained and concentrated effort spent engaging in learning activities associated with the subject. A sporadic approach in which the student engages in the learning activities over a long time period may not necessarily result in the student truly understanding the subject because students forget things with the passage of time.

Thus, in a step 1815, the system filters the learning activities correlated to the particular education standard to identify a subset of correlated activities that were completed within the specified rolling time period.

In a step 1820, the system calculates a first value indicating a count of the number of activities in the subset of correlated activities that were completed within the specified rolling time period. In a step 1825, the system calculates a second value indicating an average grade received for the activities in the subset of correlated activities.

In a step 1830, based on the first and second values, the system determines a level of achievement of the particular education standard. The level of achievement may be displayed by the system such as on an electronic screen, printed onto a paper report, or both.

In a specific embodiment, there are two variables involved in determining a level of achievement of a particular education standard. A first variable may be labeled as "AccessCount." Access count refers to how many times a specific skill is accessed. A second variable may be labeled as "EarliestValidAccessTime." Earliest valid access time refers to the earliest time a skill was accessed to make it valid. In a specific embodiment, calculating the level of achievement is based on a degradation function. The longer that skill was last accessed, the more time it would need to be validated as 'acquired.' In a specific embodiment, under a year, the results is an average of responses.

Table B below shows an example of the earliest valid access time and access count variables being used to determine a level of achievement of a particular education standard or skill.

TABLE B

| EarliestValidAccessTime | AccessCount | AchievementAverageScores |
|---|---|---|
| 365 days | 5 | 70% |

In other words, in this specific embodiment, if the skill was last performed a year ago (this could be varied for each skills), the student would need to have accessed the skills 5 times before a year ago with average over 70 percent, otherwise the skill is considered not acquired. Before 365 days, if the average scores of 5 accesses is over 70 percent the skill is considered acquired. If not, the result is average number of scores. It should be appreciated that this function can be further changed to change the variables for each skill, such as less days, less access count required, higher achievement average scores, or combinations of these as desired.

Figure 19:
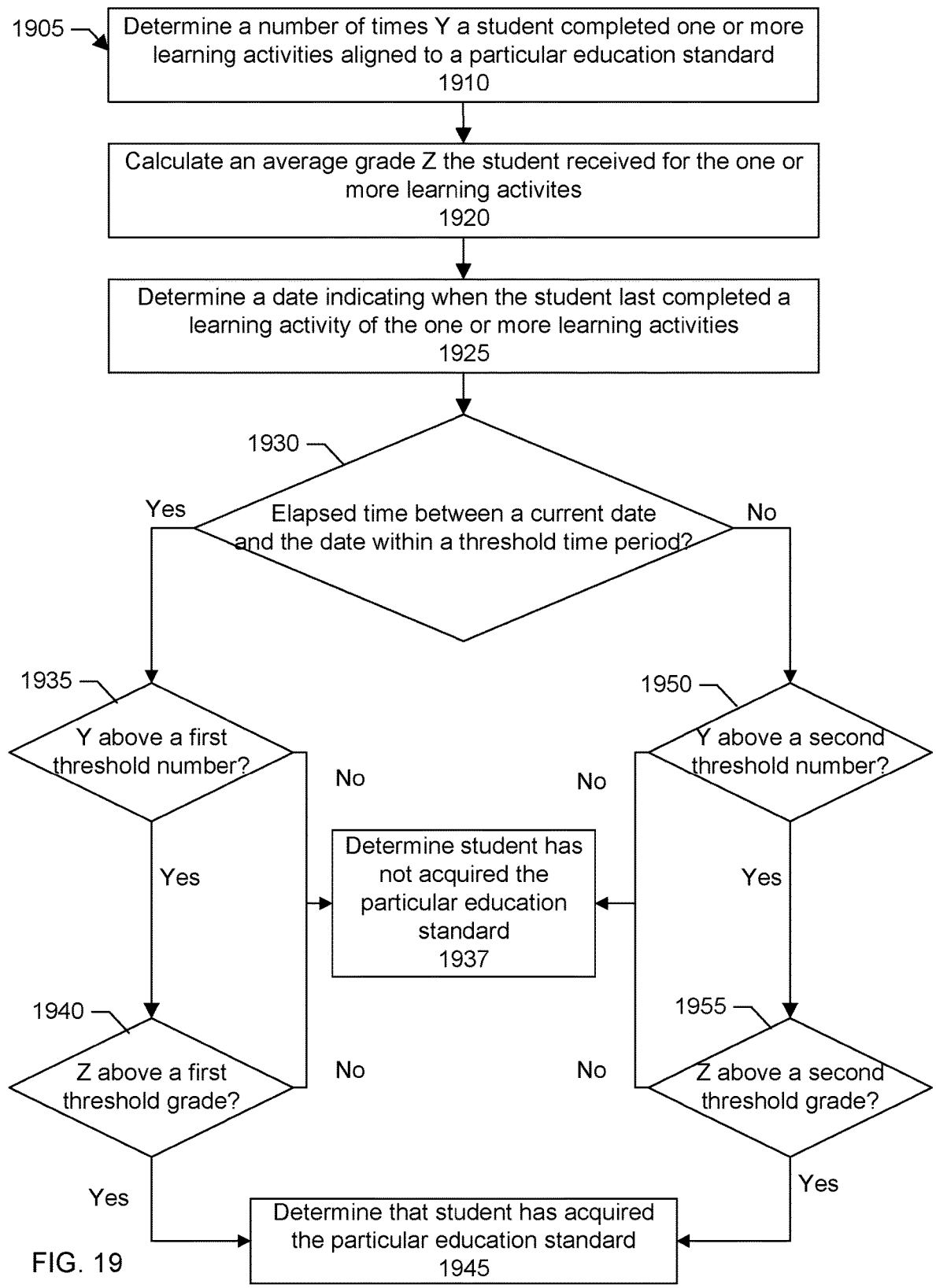
FIG. 19 shows a flow for determining a student's level of achievement of a particular education standard according to another specific embodiment.

For example, FIG. 19 shows a flow 1905 for determining whether a student achieved a particular education standard or skill according to another specific embodiment. In a step 1910, the system determines or counts a number of times Y that a student completed one or more mobile application learning activities aligned to the particular education standard. In a step 1920, the system calculates an average grade Z that the student received for the one or more learning activities.

In a step 1925, the system determines a date indicating when the student last completed a learning activity of the one or more learning activities. In a step 1930, the system calculates an elapsed amount of time between a current date and the date and determines whether the elapsed amount of time is within a threshold time period.

If the elapsed time is within the threshold time period, in a step 1935, the system determines whether the Y number of times the student completed the one or more learning activities is above a first threshold number of times. If Y is below the first threshold number of times, in a step 1937, the system determines that the student has not acquired the particular education standard or skill.

Alternatively, if Y is above the first threshold number of times, in a step 1940, the system determines whether the student's average grade Z is above a first threshold average grade.

If the student's average grade Z is above the first threshold average grade, in a step 1945, the system determines that the student has acquired the particular education standard or skill. Alternatively, if the student's average grade Z is below the first threshold average grade, the system determines that the student has not acquired the particular education standard (step 1937).

Referring back to step 1930, the elapsed amount of time may be outside the threshold time period if the elapsed amount of time is greater than the threshold time period. If the elapsed amount of time is outside the threshold time period, in a step 1950, the system determines whether the Y number of times the student completed the one or more learning activities is above a second threshold number of times.

If Y is below the second threshold number of times, in step 1937, the system determines that the student has not acquired the particular education standard or skill. Alternatively, if Y is above the second threshold number of times, in a step 1955, the system determines whether the student's average grade Z is above a second threshold average grade.

If the student's average grade Z is above the second threshold average grade, in step 1945, the system determines that the student has acquired the particular education standard or skill.

In a specific embodiment, the second threshold number of times is greater than the first threshold number of times, and the second threshold average grade is greater than the first threshold average grade. This feature of the system recognizes that students can forget things with the passage of time and that repetition can help to improve retention. Thus, in this specific embodiment, the longer that a particular skill was last accessed, the more times the skill needs to have been accessed before the system considers the student to have acquired that particular skill. Similarly, the longer that the particular skill was last accessed, the system may require that the user have scored a high average grade. Alternatively, if the particular skill was last accessed recently, the skill can be accessed a fewer number of times before the system considers the student to have acquired that particular skill. Likewise, with a more recent access, the system may allow for a lower average grade.

The system, however, is highly configurable and flexible so that administrators and other educators can tailor the achievement calculation algorithm according to their own beliefs and convictions regarding whether a student has acquired a particular education standard or skill. Specifically, each of the threshold time period, first threshold number of times, second threshold number of times, first threshold average grade, and second threshold average grade may be configurable. For example, in another specific embodiment, the second threshold number of times is configured to be greater than the first threshold number of times, but the second threshold average grade and the first threshold average grade are the same.

Further, each of the threshold time period, first threshold number of times, second threshold number of times, first threshold average grade, and second threshold average grade may be configurable at the level of a particular education standard or skill. For example, there can be a first education standard associated with a first threshold time period, a first threshold number of times, a second threshold number of times, a first threshold average grade, and a second threshold average grade.

There can be a second education standard, different from the first education standard, that is associated with a second threshold time period, a third threshold number of times, a fourth threshold number of times, a third threshold average grade, and a fourth threshold average grade. The first threshold time period may be the same as or different from the second threshold time period. The first threshold number of times may be the same as or different from the third threshold number of times. The second threshold number of times may be the same as or different from the fourth threshold number of times. The first threshold average grade may be the same as or different from the third threshold average grade. The second threshold average grade may be the same as or different from the fourth threshold average grade.

The system can further allow for the configuration of the lower limits, upper limits, or both when determining whether a value falls above, below, within, or outside a threshold. For example, a value may be above a threshold when the value is greater than the threshold. A value may be above the threshold when the value is greater than or equal to the threshold. A value may be below a threshold when the value is less than the threshold. A value may be below the threshold when the value is less than or equal to the threshold.

In a specific embodiment, a method to determine whether a particular education standard or skill has been acquired or achieved includes determining a date indicating when one or more learning activities aligned to a particular education standard was last accessed by a student. If an elapsed amount of time between the date and a current date is less than a threshold time period, using a first function to determine whether the student achieved the particular education standard. If the elapsed amount of time is greater than the threshold time period, using a second function, different from the first function, to determine whether the student achieved the particular education standard. Achieving the particular education standard according to the first function requires the student to have successfully completed the one or more learning activities at least a first threshold number of times. Achieving the particular education standard according to the second function requires the student to have successfully completed the one or more learning activities at least a second threshold number of times, greater than the first threshold number of times.

Below is an example of calculating a student's level achievement of a particular education standard.

TABLE C

| activityid | skill_code | result(input by teacher) | time submitted | student_id |
|---|---|---|---|---|
| K.5.S.2, | CRL K.7 | 30% | May 18, 2015 20:10 | 00001 |
| K.5.R.1, | CRL K.7 | 30% | May 16, 2015 19:05 | 00001 |
| K.9.L.1, | CRL K.7 | 30% | May 16, 2015 20:08 | 00001 |
| K.13.L.1, | CRL K.7 | 30% | May 15, 2015 17:02 | 00001 |
| K.13.L.2, | CRL K.7 | 60% | May 15, 2015 14:03 | 00001 |
| K.13.R.2, | CRL K.7 | 60% | May 14, 2015 13:10 | 00001 |
| K.15.L.1, | CRL K.7 | 60% | May 13, 2015 18:15 | 00001 |
| K.16.R.1, | CRL K.7 | 60% | May 12, 2015 07:10 | 00001 |
| K.19.L.2 | CRL K.7 | 100% | May 18, 2015 20:11 | 00001 |
| K.20.L.1, | CRL K.7 | 100% | May 18, 2015 21:35 | 00001 |
| K.25.R.2, | CRL K.7 | 100% | May 18, 2015 22:33 | 00001 |
| K.28.R.2 | CRL K.7 | 100% | May 18, 2015 18:30 | 00001 |
| K.25.L.1, | CL K.1d | 30% | May 17, 2015 18:10 | 00002 |
| K.25.L.2, | CL K.1d | 30% | May 17, 2015 16:20 | 00002 |
| K.25.S.1, | CL K.1d | 60% | May 17, 2015 15:30 | 00002 |
| K.25.S.2, | CL K.1d | 60% | May 17, 2015 20:10 | 00002 |
| K.26.S.1, | CL K.1d | 100% | May 17, 2015 22:40 | 00002 |
| K.26.S.2 | CL K.1d | 100% | May 17, 2015 23:45 | 00002 |
| K.5. S.2, | CRL K.7 | 30% | May 16, 2015 19:10 | 00003 |
| K.5.R.1, | CRL K.7 | 30% | May 16, 2015 18:35 | 00003 |
| K.9.L.1, | CRL K.7 | 30% | May 16, 2015 17:45 | 00003 |
| K.13.L.1, | CRL K.7 | 30% | May 16, 2015 19:25 | 00003 |
| K.13.L.2, | CRL K.7 | 30% | May 16, 2015 17:10 | 00003 |
| K.13.R.2, | CRL K.7 | 60% | May 16, 2015 16:55 | 00003 |
| K.15.L.1, | CRL K.7 | 100% | May 16, 2015 15:10 | 00003 |
| K.16.R.1, | CRL K.7 | 100% | May 16, 2015 19:12 | 00003 |
| K.19.L.2 | CRL K.7 | 100% | May 16, 2015 18:33 | 00003 |
| K.20.L.1, | CRL K.7 | 100% | May 16, 2015 12:10 | 00003 |
| K.25.R.2, | CRL K.7 | 100% | May 16, 2015 16:10 | 00003 |
| K.28.R.2 | CRL K.7 | 100% | May 16, 2015 11:45 | 00003 |
| . . . | CRF K.1b | Average(SUM) =55.666 14 = 30% 42 = 60% 4 = 100% | . . . | 0004 |

Table C above shows some of student usage and activity data that may be collected in or derived from the system repositories or data stores. In a specific embodiment, the system calculates a "$S_{[skillcode]}$" which indicates a skill measured in percent for a certain education standard. The calculation involves selecting from the repository a subset of student records based on when the student submitted their responses.

For example, an administrator may query the system to retrieve student responses submitted within the past T weeks (e.g., within the past 32 weeks). In other words, if the administrator specifies the last 32 weeks the relevant time period would be the current date minus 32 weeks. That time period will be the range the system will query the activityid and their results. From the subset of student records, the system calculates a frequency value. Frequency is a count of activityids that match the skill_code during this period. It is noted that in table C above the specific listing of learning activities have been omitted for student ID 0004 for brevity.

In a specific embodiment, determining achievement of an education standard or skill is a binary result, i.e., the student either did or did not achieve the education standard or skill.

In another specific embodiment, determining achievement is along a gradient and may be expressed, for example, as a percentage or degree of achievement.

In this example, there can a variable $S_{CRL\ K.1}$ that indicates a skill measured in percent for the standard identified as CRL K.1. The data field activityid uniquely identifies the learning activities. For example, the activity ID "K.1.L.1" refers to Kindergarten.Week.Listen.Activity1. The data field "skill_code" refers to a skill code that may be mapped to a particular education standard, e.g., CRL K.1. A frequency is calculated which is a count of the number of times each skill code appeared in the predetermined rolling time period (e.g., from t=0 (week) to t=n:n<32). The data field "result" shows the grade or score the student received for the corresponding learning activity. As an example, the grade may be scaled as follows: Exceed=100%, Meet=60%, Need Help=30%. The data field "Time" indicates the time and date that the student submitted their response. The data filed "student_id" indicates the unique student id.

More particularly, the data in table C shows that there are four students including a first student having a student ID 00001, a second student having a student ID 00002, a third student having a student ID 00004, and a fourth student having a student ID 00004. The first student has completed twelve learning activities within a 32-week rolling time period that are correlated to the skill code "CRL K.7." The twelve learning activities correlated to skill code "CRL K.7" include (1) K.5.S.2, (2) K.5.R.1, (3) K.9.L.1, (4) K.13.L.1, (5) K.13.L.2, (6) K.13.R.2, (7) K.15.L.1, (8) K.16.R.1, (9) K.19.L.2, (10) K.20.L.1, (11) K.25.R.2, and (12) K.28.R.2. The learning activities received a score of 30%, 30%, 30%, 30%, 60%, 60%, 60%, 60%, 100%, 100%, 100%, and 100%, respectively, and the average score is calculated as 63.333% (e.g., 30%+30%+30%+30%+60%+60%+60%+60%+100%+100%+100%+100%=760%/12=63.333%).

The second student has completed six learning activities within the 32-week rolling time period that are correlated to the skill code "CL K.1d." The six learning activities correlated to skill code "CL K.1d" include (1) K.25.L.1, (2) K.25.L.2, (3) K.25.S.1, (4) K.25.S.2, (5) K.26.S.1, and (6) K.26.S.2. The learning activities received a score of 30%, 30%, 60%, 60%, 100%, and 100%, respectively, and the average score is calculated as 63.333%

The third student has completed twelve learning activities within the 32-week rolling time period that are correlated to the skill code "CRL K.7." The twelve learning activities correlated to skill code "CRL K.7" include (1) K.5.S.2, (2) K.5.R.1, (3) K.9.L.1, (4) K.13.L.1, (5) K.13.L.2, (6) K.13.R.2, (7) K.15.L.1, (8) K.16.R.1, (9) K.19.L.2, (10) K.20.L.1, (11) K.25.R.2, and (12). K.28.R.2. The learning activities received a score of 30%, 30%, 30%, 30%, 30%, 60%, 100%, 100%, 100%, 100%, 100%, and 100%, respectively, and the average score is calculated as 67.5%.

The fourth student has completed sixty learning activities within the 32-week rolling time period that are correlated to the skill code "CRF K.1b." As discussed above, the specific listing of learning activities have been omitted from the table for brevity. In this example, the learning activities received an average score of 55.666%, fourteen of the sixty activities were scored as 30% (i.e., "need help"), forty-two of the sixty activities were scored as 60% (i.e., "meet"), and four of the sixty activities were scored as 100% (i.e., "exceed").

In a specific embodiment, two algorithms are provided for calculating a level of achievement of a particular education standard. Determining which algorithm to use is based on a count of the number of correlated activities that were completed within the specified rolling time period. If the count is less than a first threshold value, a first algorithm is used to calculate the level of achievement. If the count is greater than or equal to the first threshold value, a second algorithm, different from the first algorithm, is used to calculate the level of achievement. In a specific embodiment, the first threshold value is 5. The threshold values may be user-configurable such as by an administrator.

In this specific embodiment, the first algorithm to calculate the level of achievement is based on calculating an average score received for the correlated learning activities. Below is an example of the first algorithm.

If frequency(skill code)<5, then $S_{CRL\ K.1}$=Average (score of CRL K.1)

In this specific embodiment, the second algorithm to calculate the level of achievement is a function of the average score, a count of the number of correlated activities completed within the specified rolling time period, and a count of the number of correlated activities that were scored at or above a threshold score.

If frequency(skill code)≥5, then $S_{CRL\ K.1}$=f(result,frequency,count(100%),time)

In a specific embodiment, the function of the second algorithm is as follows:

$$s_{CRLK.1} = \text{Max}\left(\text{Average(Result)} \times \min\left(1, \frac{\text{frequency}}{5}\right), \left(\min\left(\frac{\text{count(Exceeds)}}{5}, 1\right)\right)\right)$$

In other words, in this specific embodiment, calculating a level of achievement of a particular education standard is based on a number of factors and is as follows:

Step 1: Calculate a first value by averaging the scores received on the learning activities correlated to the particular education standard.

Step 2: Calculate a second value by finding a minimum value within a first data range having a first argument and second argument. A value of the first argument is one. A value of the second argument is a count of the number of correlated activities completed within the specified rolling time period divided by the first threshold value (e.g., 5).

Step 3: Multiply the second value and the first value to obtain a third value.

Step 4: Calculate a fourth value by finding a minimum value within a second data range having a third argument and a fourth argument. A value of the third argument is a count of the number of correlated activities that were scored at or above a threshold score (e.g., 100% or "exceeds") divided by the first threshold value (e.g., 5). A value of the fourth argument is one.

Step 5: Select a maximum value of a third data range having the third value and the fourth value.

Step 6: Determine that the level of achievement of the particular education standard is the selected maximum value. In a specific embodiment, the value is a weighed function. There is a first condition and a second condition. For the first condition, if the student completes at least R number of activities for which the student received at least an S score, the system determines that the student has achieved the standard (e.g., student gets enough right (e.g., more than 5 times right at 100%), then the student knows it). For the second condition, if the student completed more than R number of activities, but received a lower than S score, then the system determines that the student's level of achievement is the average (e.g., If student did it many times and did not get a lot of right answers, then the student's level is the average; If student did it a few times (e.g., <5) and student got everything right, the result is the average x the weighed results.)

Below are example level of achievement calculations for the students and data shown in table C above.

For Student 00001 and Skill ID CRL K.7

$$s_{CRLK.7} = \text{Max}\left(\text{Average(Result)} \times \min\left(1, \frac{\text{frequency}}{5}\right), \left(\min\left(\frac{\text{count(Exceeds)}}{5}, 1\right)\right)\right)$$

$= \text{Max}(63.3\% \times \min(1, 12/5), \min(4/5, 1))$ $= \text{Max}((63.3\% \times 1,), 4/5)$ $= 80\%$ For Student 00002 and Skill ID CL K.1d.

$= \text{Max}(63.33\% \times \min(1, 6/5), \min(2/5, 1))$ $= \text{Max}(63.33\% \times 1, 2/5)$ $= 63.33\%$ For Student 00003 and Skill ID CL K.1d.

$= \text{Max}(67.50\% \times \min(1, 12/5), \min(6/5, 1))$ $= \text{Max}(67.50\% \times 1, 1)$ $= 100\%$ For Student 00004 and Skill ID CRF K.1b, $$s_{CRFK.1b} = \text{Max}\left(\text{Average(Result)} \times \min\left(1, \frac{\text{frequency}}{5}\right), \left(\min\left(\frac{\text{count(Exceeds)}}{5}, 1\right)\right)\right)$$

$= \text{Max}(55.67\% \times \min(1, 60/5), \min(4/5, 1))$ $= \text{Max}((55.67\% \times 1,), 4/5)$ $= 80\%$ Referring back to FIG. 2, in a specific embodiment, the system includes a tracking and invoicing module to track whether a user downloaded and purchased a recommended mobile application. In this specific embodiment, a developer of the mobile application may then be charged a referral fee based on the user having downloaded recommended app, purchased the recommended app, or both.

Features of the system may be implemented as a website, mobile website, or mobile application. For example, the mobile application recommendation engine may be implemented as a mobile application that executes on a mobile device, separate from a browser program of the mobile device, to provide recommendations of educational mobile applications. The mobile application recommendation engine may be implemented as a website in which pages of the recommendation engine are rendered within a browser program.

In a specific embodiment, a system includes the participation of three entities. A first entity includes App Developers. A second entity includes Correlation Services. A third entity includes Users. Records of the system may include an Activity Table, Correlation Records, and Student Records.

Below are some benefits of the system.

1. App can have its correlations done post product release.

2. App can have multiple standards correlated to the same App.

3. User outputs on an App now have meanings or context against an education standard.

4. Previous user output (e.g., responses) on an App can be measured against new education standards when they are added for that App. The system can recommend mobile applications to help the student meet the new education standards. For example, in some cases, the system may determine that the student has satisfied an education standard and may not recommend an App. When, however, a new education standard is identified, the system can reassess or reanalyze the student's past performance, determine that student does not meet the new education standard, and recommend the App if the App includes learning activities aligned to the new education standard.

Below are some features of the system.

1) Allow for inquires as to what standards the App is aligned to.

2) Allow for inquiries regarding student performance of a particular standards based on the student's outputs on a particular App or collection of Apps.

3) Recommend relevant Apps that address a particular set of standards based on student performance history.

In a specific embodiment, a flow for App Developers is as follows:

1) App Developer logins in an App Developer Service platform of the system with their company information and obtains access to submission process and retrieves their App records on the server and can view correlation status for future marketing needs.

2) App Developer submits their App record (e.g., application name or title, version, and description) which tags the specific App and its version in the system database.

3) App Developer further submits their App Activity Table which tags the specific App's areas of user activities where there would be outputs. The protocol of generating Activity ID is shared with the App Developer and may be double-checked during submission. Submission can be done via uploading a file (cvs or excel) or entering manually.

4) In a specific embodiment, the above steps are performed through a web interface and a specific ID is given to the App developer for future communications with the Student Records Server of the system.

5) If there is a new version of the App, the App Developer may submit a new version of the App Activity Table and can denote whether the Activity IDs (items) are the same as the previous, so the system can prompt further correlation services if need be.

In a specific embodiment, a flow for Correlation Services is as follows:

1) Based on App Activity Table and the App, Correlation Services reviews standards and tag them on the system server through a web interface. This step will not require App Developers.

2) The correlation agent loads up the correlation service browser and chooses the App to start correlations.

3) The correlation agent can correlate an App to a specific set of standards or a specific set of standards to an App.

4) The correlation produces an Activity Standard table that ties the standards to the App.

5) Once the correlation is done and verified, the agent submits the correlation status thus updates the status for App Developers when it logins onto the App Developer server.

6) Multiple standards can be correlated to the same App post product release date.

In a specific embodiment, a flow for Saving User Records is as follows:

1) App Developer passes the App Activity Outputs (e.g., student responses) based on the Activity Table when student performs an action.

In a specific embodiment, a flow for Retrieving User Records & Context for Applications is as follows:

1) Instructional Query System (IQS) can make query on a specific App to see what standards it aligns to.

2) IQS can make a query on what standards a student can achieve based on her usage and outputs from one or multiple apps.

3) IQS can make query on what Apps that student should use (given there may be multiple apps on the system) and the student's own records.

As discussed above, a specific aspect of the system provides for correlating educational computing programs and education standards in order to track student progress in achieving the education standards. Principles of the system, however, are applicable other computing programs that may not necessarily be considered educational programs. For example, computing games (e.g., Angry Birds) may be correlated to a standard (e.g., a physical education standard) that helps to measure hand-eye coordination.

In a specific embodiment, a method includes storing a first plurality of education standards, receiving a plurality of activity tables for a plurality of mobile applications, each activity table being associated with a particular mobile application and comprising a listing of learning activities in the particular mobile application, receiving, from a correlation services agent user, correlations of the learning activities to the education standards, generating, in response to the correlations, an index cross-referencing the learning activities to the education standards, receiving, from a user, a specification of an education standard of the first plurality of education standards that the user wishes to satisfy, scanning the index to identify which mobile applications have one or more learning activities that are aligned to the specified education standard, and displaying, on an electronic screen for the user, the mobile applications having the one or more learning activities that are aligned to the specified education standard.

The method may include receiving a first activity table associated with a first mobile application, the first mobile application having been developed by a first developer, and receiving a second activity table associated with a second mobile application, the second mobile application having been developed by a second developer, different from the first developer.

The method may include after the generating an index, storing a second plurality of education standards, different from the first plurality of education standards, receiving, from the correlation services agent user, a mapping of the second plurality of education standards to the first plurality of education standards based on the correlation services agent user identifying equivalencies between education standards of the second and first plurality of education standards, and updating the index based on the mapping. The method may include receiving an executable version of a mobile application of the plurality of mobile applications.

The method may include determining a date indicating when the one or more learning activities aligned to the specified education standard was last accessed, if an elapsed amount of time between the date and a current date is less than a threshold time period, using a first function to determine whether the user achieved the specified education standard, and if the elapsed amount of time is greater than the threshold time period, using a second function, different from the first function, to determine whether the user achieved the specified education standard, wherein achieving the specified education standard according to the first function requires the user to have successfully completed the one or more learning activities at least a first threshold number of times, and wherein achieving the specified education standard according to the second function requires the user to have successfully completed the one or more learning activities at least a second threshold number of times, greater than the first threshold number of times.

The method may include after the displaying the mobile applications having the one or more learning activities that are aligned to the specified education standard, receiving an indication that the user downloaded a displayed mobile application, and requesting a referral fee from a developer of the displayed mobile application based on the user having downloaded the displayed mobile application.

The method may include determining a level of achievement by the user of the specified education standard, wherein the determining includes excluding a grade received by the user for a first learning activity aligned to the specified education standard because the user completed the first learning activity outside a specified rolling time period.

A first activity table may include a description specifying a location within a first mobile application where a first learning activity of the first mobile application may be found, and the method may include displaying, at a client computer, the description to permit the correlation services agent user to navigate to the first learning activity of the first mobile application, wherein the first mobile application is executing on a mobile device, different from the client computer.

In another specific embodiment, a method includes storing a first plurality of education standards comprising a plurality of main categories, and a plurality of subcategories within each main category, receiving a first activity table associated with a first mobile application developed by a first developer, the first activity table comprising a first listing of learning activities in the first mobile application, receiving a second activity table associated with a second mobile application developed by a second developer, different from the first developer, the second activity table comprising a second listing of learning activities in the second mobile application, receiving, from a correlation services agent user, a correlation of learning activities in the first activity table to the subcategories of the first plurality of education standards based on a review of the first mobile application by the correlation services agent user, receiving, from the correlation services agent user, a correlation of learning activities in the second activity table to the subcategories of the first plurality of education standards based on a review of the second mobile application by the correlation services agent user, generating, in response to the correlations by the correlation services agent user, an index cross-referencing the learning activities in the first and second mobile applications to the subcategories of the first plurality of education standards, receiving, from a user, a specification of a main category of an education standard of the first plurality of education standards that the user wishes to satisfy, scanning the index to identify which mobile applications have one or more learning activities that are aligned to subcategories within the specified main category, displaying, on an electronic screen for the user, the first mobile application, and not displaying the second mobile application, wherein the first mobile application comprises one or more learning activities that are aligned to the subcategories within the specified main category of the education standard, and the second mobile application does not comprise one or more learning activities that are aligned to the subcategories within the specified main category of the education standard.

The method may include receiving, from a mobile device of the user, a first grade based on the user having completed a first learning activity in the first mobile application, and receiving, from the first developer of the first mobile application, a second grade based on the user having completed a second learning activity in the first mobile application, wherein the first learning activity is a first type of activity, and the second learning activity is a second type of activity, different from the first type of activity.

The method may include after the generating an index, storing a second plurality of education standards, different from the first plurality of education standards, receiving, from the correlation services agent user, a mapping of the second plurality of education standards to the first plurality of education standards based on the correlation services agent user identifying equivalencies between education standards of the second and first plurality of education standards, and updating the index based on the mapping.

The method may include determining a level of achievement of the specified main category of the education standard of the first plurality of education standards, wherein the determining includes excluding responses by the user to a first learning activity because an elapsed time between a time the responses to the first learning activity were submitted and a current time is greater than a threshold time period, and including responses by the user to a second learning activity because an elapsed time between a time the responses to the second learning activity were submitted and the current time is less than the threshold time period.

The first activity table may include a description specifying a location within the first mobile application where the first learning activity of the first mobile application may be found, and the method may include displaying, at a client computer, the description to permit the correlation services agent user to navigate to the first learning activity of the first mobile application, wherein the first mobile application is executing on a mobile device, different from the client computer.

The method may include determining a date indicating when the one or more learning activities of the first mobile application was last accessed by the user, if an elapsed amount of time between the date and a current date is less than a threshold time period, using a first function to determine whether the user achieved the specified main category of the education standard, and if the elapsed amount of time is greater than the threshold time period, using a second function, different from the first function, to determine whether the user achieved the specified main category of the education standard, wherein achieving the specified main category of the education standard according to the first function requires the user to have successfully completed the one or more learning activities at least a first threshold number of times, and wherein achieving the specified main category of the education standard according to the second function requires the user to have successfully completed the one or more learning activities at least a second threshold number of times, greater than the first threshold number of times.

In another specific embodiment, a method includes storing, in a database, a plurality of education standards, receiving a first activity table associated with a first mobile application developed by a first developer, the first activity table comprising a first listing of learning activities in the first mobile application, receiving, from a correlation services agent user, a correlation of learning activities in the first activity table to the plurality of education standards based on a review of the first mobile application by the correlation services agent user, determining a date indicating when one or more learning activities aligned to a particular education standard was last accessed by a student, if an elapsed amount of time between the date and a current date is less than a threshold time period, using a first function to determine whether the student achieved the particular education standard, and if the elapsed amount of time is greater than the threshold time period, using a second function, different from the first function, to determine whether the student achieved the particular education standard, wherein achieving the particular education standard according to the first function requires the student to have successfully completed the one or more learning activities at least a first threshold number of times, and wherein achieving the particular education standard according to the second function requires the student to have successfully completed the one or more learning activities at least a second threshold number of times, greater than the first threshold number of times.

The first activity table may include a description specifying a location within the first mobile application where the first learning activity of the first mobile application may be found, and the method may include displaying, on an electronic screen of a client computer, the description to permit the correlation services agent user to navigate to the first learning activity of the first mobile application, wherein the first mobile application is executing on a mobile device, different from the client computer.

The method may include displaying, on an electronic screen of a client computer, an identification of the first learning activity, and a listing of education standards of the plurality of education standards, receiving, from the correlation services agent user, a selection of an education standard displayed in the listing, and associating the first learning activity to the selected education standard.

The method may include generating an index comprising a listing of learning activities in the first activity table, a listing of learning activities in a second activity table, and identifications of the education standards of the plurality of education standards to which the learning activities of the first and second activity tables are correlated, wherein the second activity table is associated with a second mobile application developed by a second developer, different from the first developer.

The method may include receiving from the student a specification of an education standard that the student wishes to satisfy, scanning an index comprising the learning activities in the first mobile application, learning activities in a second mobile application, and identifications of the education standards of the plurality of education standards to which the learning activities of the first and second mobile application are correlated, based on the scanning, identifying a mobile application having at least one learning activity aligned to the education standard that the student wishes to satisfy, recommending to the student the first mobile application because the first mobile application comprises at least one learning activity aligned to the education standard that the student wishes to satisfy, and not recommending to the student the second mobile application because the second mobile application does not comprise at least one learning activity aligned to the education standard that the student wishes to satisfy.

The method may include receiving a second activity table associated with a second mobile application developed by a second developer, different from the first developer.

In another specific embodiment, there is a system comprising a processor-based system executed on a computer system and configured to store a set of education standards, receive activity tables associated with mobile applications, receive correlations of learning activities listed in activity tables to the education standards, recommend a subset of the mobile applications to a student based on particular education standard the student wishes to achieve, track the student's usage of the subset of mobile applications, and determine whether the student achieved the particular education standard.

In another specific embodiment, there is a computer program product, comprising a non-transitory computer-readable medium having a computer-readable program code embodied therein, the computer-readable program code adapted to be executed by one or more processors to implement a method including storing a set of education standards, receiving activity tables associated with mobile applications, receiving correlations of learning activities listed in activity tables to the education standards, recommending a subset of the mobile applications to a student based on particular education standard the student wishes to achieve, tracking the student's usage of the subset of mobile applications, and determining whether the student achieved the particular education standard.

In another specific embodiment, there is a method for transmitting code including transmitting code for storing a set of education standards, transmitting code for receiving activity tables associated with mobile applications, transmitting code for receiving correlations of learning activities listed in activity tables to the education standards, transmitting code for recommending a subset of the mobile applications to a student based on particular education standard the student wishes to achieve, transmitting code for tracking the student's usage of the subset of mobile applications, and transmitting code for determining whether the student achieved the particular education standard.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for recommending educational application programs and assessing progress in meeting education standards comprising:

storing a first plurality of education standards;

receiving a plurality of activity tables for a plurality of application programs, each activity table being associated with a particular application program and comprising a listing of learning activities in the particular application program;

receiving correlations of the learning activities to the education standards;

generating, in response to the correlations, an index cross-referencing the learning activities to the education standards;

receiving a specification of an education standard of the first plurality of education standards that a user is to satisfy;

searching the index to identify which application programs have one or more learning activities that are aligned to the specified education standard;

recommending one or more application programs to the user;

determining a date indicating when the one or more learning activities aligned to the specified education standard was last accessed by accessing a database file storing timestamps indicating when the one or more learning activities was last accessed;

determining that an elapsed amount of time between the date and a current date is less than a threshold time period, and upon the determination that the elapsed amount of time is less than the threshold time period, using a first function to determine whether the user achieved the specified education standard, the first function comprising evaluating whether a first plurality of conditions have been satisfied, wherein the first plurality of conditions comprise:

a first condition of the first plurality of conditions is satisfied when a number of times the user completed the one or more learning activities is above a first threshold count; and a second condition of the first plurality of conditions is satisfied when an average grade the user received for the one or more learning activities is above a first threshold average; and determining that the user achieved the specified education standard when each of the first and second conditions of the first plurality of conditions have been satisfied;

determining that the elapsed amount of time is greater than the threshold time period, and upon the determination that the elapsed amount of time is greater than the threshold time period, using a second function, different from the first function, to determine whether the user achieved the specified education standard, the second function comprising evaluating whether a second plurality of conditions have been satisfied, wherein the second plurality of conditions comprise:

a first condition of the second plurality of conditions is satisfied when the number of times the user completed the one or more learning activities is above a second threshold count, greater than the first threshold count; and a second condition of the second plurality of conditions is satisfied when the average grade the user received for the one or more learning activities is above a second threshold average, greater than the first threshold average; and determining that the user achieved the specified education standard when each of the first and second conditions of the second plurality of conditions have been satisfied; and recommending another of one or more application programs to the user based on the determination of whether the user achieved the specified education standard, wherein the recommending comprises searching the index for an application program to recommend the application program having at least one learning activity aligned to the specified education standard that the user is to satisfy when the determination is that the user has not achieved the specified education standard, and not recommending another application program because the other application program does not comprise the at least one learning activity aligned to the specified education standard that the user is to satisfy.

2. The method of claim 1 comprising:

receiving a first activity table associated with a first application program, the first application program having been developed by a first developer; and receiving a second activity table associated with a second application program, the second application program having been developed by a second developer, different from the first developer.

3. The method of claim 1 comprising:

after the generating an index, storing a second plurality of education standards, different from the first plurality of education standards;

receiving a mapping of the second plurality of education standards to the first plurality of education standards based on an identification of equivalencies between education standards of the second and first plurality of education standards; and updating the index based on the mapping.

4. The method of claim 1 comprising:

receiving an executable version of an application program of the plurality of application programs.

5. The method of claim 1 comprising:

after the recommending one or more application programs to the user, receiving an indication that an application program was downloaded; and requesting a referral fee from a developer of the downloaded application program.

6. The method of claim 1 comprising:

determining a level of achievement of the specified education standard, wherein the determining comprises:

excluding a grade received for a first learning activity aligned to the specified education standard because the first learning activity was completed outside a specified rolling time period.

7. The method of claim 1 wherein a first activity table comprises a description specifying a location within a first application program where a first learning activity of the first application program may be found, and the method comprises:

displaying, at a client computer, the description to permit navigation to the first learning activity of the first application program, wherein the first application program is executing on a computing device, different from the client computer.

8. A method comprising:
storing a first plurality of education standards comprising a plurality of main categories, and a plurality of subcategories within each main category;
receiving a first activity table associated with a first application program developed by a first developer, the first activity table comprising a first listing of learning activities in the first application program;
receiving a second activity table associated with a second application program developed by a second developer, different from the first developer, the second activity table comprising a second listing of learning activities in the second application program;
receiving a correlation of learning activities in the first activity table to the subcategories of the first plurality of education standards based on a review of the first application program;
receiving a correlation of learning activities in the second activity table to the subcategories of the first plurality of education standards based on a review of the second application program;
generating, in response to the correlations, an index cross-referencing the learning activities in the first and second application programs to the subcategories of the first plurality of education standards;
receiving a specification of a main category of an education standard of the first plurality of education standards that a user is to satisfy;
searching the index to identify which application programs have one or more learning activities that are aligned to subcategories within the specified main category;
displaying, on an electronic screen for the user, the first application program;
not displaying the second application program, wherein the first application program comprises one or more learning activities that are aligned to the subcategories within the specified main category of the education standard, and the second application program does not comprise one or more learning activities that are aligned to the subcategories within the specified main category of the education standard;
determining a level of achievement of the specified main category of the education standard of the first plurality of education standards, wherein the determining comprises:
excluding responses by the user to a first learning activity because an elapsed time between a time the responses to the first learning activity were submitted and a current time is greater than a threshold time period; and
including responses by the user to a second learning activity because an elapsed time between a time the responses to the second learning activity were submitted and the current time is less than the threshold time period, wherein the threshold time period is a first threshold time period and the determining the level of achievement comprises:
determining, for the included responses, a date indicating when the one or more learning activities of the first application program was last accessed by the user;
determining that an elapsed amount of time between the date and the current time is less than a second threshold time period, and upon the determination that the elapsed amount of time is less than the second threshold time period, using a first function to determine whether the user achieved the specified main category of the education standard, the first function comprising evaluating whether a first plurality of conditions have been satisfied, wherein the first plurality of conditions comprise:
a first condition of the first plurality of conditions is satisfied when a number of times the user completed the one or more learning activities is above a first threshold count; and
a second condition of the first plurality of conditions is satisfied when an average grade the user received for the one or more learning activities is above a first threshold average; and
determining that the user achieved the specified main category of the education standard when each of the first and second conditions of the first plurality of conditions have been satisfied; and
determining that the elapsed amount of time is greater than the second threshold time period, and upon the determination that the elapsed amount of time is greater than the second threshold time period, using a second function, different from the first function, to determine whether the user achieved the specified main category of the education standard, the second function comprising evaluating whether a second plurality of conditions have been satisfied, wherein the second plurality of conditions comprise:
a first condition of the second plurality of conditions is satisfied when the number of times the user completed the one or more learning activities is above a second threshold count, greater than the first threshold count; and
a second condition of the second plurality of conditions is satisfied when the average grade the user received for the one or more learning activities is above a second threshold average, greater than the first threshold average; and
determining that the user achieved the specified main category of the education standard when each of the first and second conditions of the second plurality of conditions have been satisfied; and
recommending another of one or more application programs to the user based on the determination of whether the user achieved the specified main category of the education standard,
wherein the recommending comprises searching the index for an application program to recommend the application program having at least one learning activity aligned to the subcategories within the specified main category of the education standard that the user is to satisfy when the determination is that the user has not achieved the specified main category of the education standard, and not recommending another application program because the other application program does not comprise the at least one learning activity aligned to the subcategories with the specified main category of the education standard that the user is to satisfy.

9. The method of claim 8 comprising:
receiving, from a client device of the user, a first grade based on the user having completed a first learning activity in the first application program; and
receiving, from the first developer of the first application program, a second grade based on the user having completed a second learning activity in the first application program, wherein the first learning activity is a first type of activity, and the second learning activity is a second type of activity, different from the first type of activity.

10. The method of claim 8 comprising:
after the generating an index, storing a second plurality of education standards, different from the first plurality of education standards;
receiving a mapping of the second plurality of education standards to the first plurality of education standards based on an identification of equivalencies between education standards of the second and first plurality of education standards; and
updating the index based on the mapping.

11. The method of claim 8 wherein the first activity table comprises a description specifying a location within the first application program where the first learning activity of the first application program may be found, and the method comprises:
displaying, at a client computer, the description to permit navigation to the first learning activity of the first application program, wherein the first application program is executing on a computing device, different from the client computer.

12. A method comprising:
storing, in a database, a plurality of education standards;
receiving a first activity table associated with a first application program developed by a first developer, the first activity table comprising a first listing of learning activities in the first application program;
receiving a correlation of learning activities in the first activity table to the plurality of education standards based on a review of the first application program;
receiving a specification of an education standard that a student is to satisfy;
searching an index comprising the learning activities in the first application program, learning activities in a second application program, and identifications of the education standards of the plurality of education standards to which the learning activities of the first and second application programs are correlated;
based on the searching, identifying an application program having at least one learning activity aligned to the specified education standard that the student is to satisfy;
recommending to the student the first application program because the first application program comprises at least one learning activity aligned to the specified education standard that the student is to satisfy;
not recommending to the student the second application program because the second application program does not comprise at least one learning activity aligned to the specified education standard that the student is to satisfy;
determining a date indicating when one or more learning activities aligned to the specified education standard was last accessed by the student;
determining that an elapsed amount of time between the date and a current date is less than a threshold time period, and upon the determination that the elapsed amount of time is less than the threshold time period, using a first function to determine whether the student achieved the specified education standard, the first function comprising evaluating whether a first plurality of conditions have been satisfied, wherein the first plurality of conditions comprise:
a first condition of the first plurality of conditions is satisfied when a number of times the student completed the one or more learning activities is above a first threshold count; and
a second condition of the first plurality of conditions is satisfied when an average grade the student received for the one or more learning activities is above a first threshold average; and
determining that the student achieved the specified education standard when each of the first and second conditions of the first plurality of conditions have been satisfied; and
determining that the elapsed amount of time is greater than the threshold time period, and upon the determination that the elapsed amount of time is greater than the threshold time period, using a second function, different from the first function, to determine whether the student achieved the specified education standard, the second function comprising evaluating whether a second plurality of conditions have been satisfied, wherein the second plurality of conditions comprise:
a first condition of the second plurality of conditions is satisfied when the number of times the student completed the one or more learning activities is above a second threshold count, greater than the first threshold count; and
a second condition of the second plurality of conditions is satisfied when the average grade the student received for the one or more learning activities is above a second threshold average, greater than the first threshold average; and
determining that the student achieved the specified education standard when each of the first and second conditions of the second plurality of conditions have been satisfied; and
recommending another of one or more application programs to the student based on the determination of whether the student achieved the specified education standard,
wherein the recommending comprises searching the index for an application program to recommend, the application program being a particular application program having at least one learning activity aligned to the specified education standard when the determination is that the student has not achieved the specified education standard, and not recommending another particular application program because the other particular application program does not comprise the at least one learning activity aligned to the specified education standard.

13. The method of claim 12 wherein the first activity table comprises a description specifying a location within the first application program where the first learning activity of the first application program may be found, and the method comprises:
displaying, on an electronic screen of a client computer, the description to permit navigation to the first learning activity of the first application program, wherein the first application program is executing on a computing device, different from the client computer.

14. The method of claim 12 comprising:
displaying, on an electronic screen of a client computer, an identification of the first learning activity, and a listing of education standards of the plurality of education standards;
receiving a selection of an education standard displayed in the listing; and
associating the first learning activity to the selected education standard.

15. The method of claim 12 wherein the index comprises a listing of learning activities in a second activity table, and identifications of the education standards of the plurality of education standards to which the learning activities of the first and second activity tables are correlated, wherein the second activity table is associated with a second application program developed by a second developer, different from the first developer.

16. The method of claim 12 wherein the second application program was developed by a second developer, different from the first developer.

17. The method of claim 12 comprising:
   allowing the student to select an education standard;
   analyzing performance data associated with the student to determine whether the student achieved the education standard;
   determining that the student did not achieve the education standard; and
   recommending to the student an application program having one or more learning activities aligned to the education standard.

18. The method of claim 12 wherein the plurality of education standards comprises an upward articulation and the method comprises:
   storing performance data associated with the student, the performance data comprising an identification of education standards of the plurality of education standards that the student achieved;
   analyzing the performance data to identify a highest education standard that the student achieved;
   identifying an education standard of the plurality of education standards immediately above the highest education standard that the student achieved; and
   recommending to the student an application program having one or more learning activities aligned to the education standard immediately above the highest education standard that the student achieved.

* * * * *